United States Patent [19]
Tanaka et al.

[11] Patent Number: 5,504,667
[45] Date of Patent: Apr. 2, 1996

[54] POWER CONVERSION SYSTEM

[75] Inventors: Shigeru Tanaka, Tokyo; Susumu Tadakuma, Kanagawa, both of Japan

[73] Assignee: Kabushiki Kaisha Toshiba, Kawasaki, Japan

[21] Appl. No.: 301,855

[22] Filed: Sep. 7, 1994

[30] Foreign Application Priority Data

Sep. 7, 1993  [JP]  Japan .................... 5-222575

[51] Int. Cl.$^6$ ............................ H02M 5/45; H02M 1/12
[52] U.S. Cl. ............................ 363/37; 363/39
[58] Field of Search .................. 363/36, 37, 39, 363/40, 41, 45, 65, 69, 95, 97, 131; 318/800–803, 805–810

[56] References Cited

U.S. PATENT DOCUMENTS

| | | | |
|---|---|---|---|
| 4,615,000 | 9/1986 | Fujii et al. | 363/41 |
| 4,663,702 | 5/1987 | Tanaka | 363/65 |
| 4,697,131 | 9/1987 | Schauder et al. | 318/762 |
| 4,760,321 | 7/1988 | Tanaka et al. | 318/809 |
| 4,788,635 | 11/1988 | Heinrich | 363/37 |
| 5,003,243 | 3/1991 | Tadakuma et al. | 318/800 |
| 5,365,158 | 11/1994 | Tanaka et al. | 318/806 |
| 5,450,311 | 9/1995 | Esparza Olcina | 363/37 |

FOREIGN PATENT DOCUMENTS

| | | |
|---|---|---|
| 0193775 | 9/1986 | European Pat. Off. . |
| 61-92173 | 5/1986 | Japan . |
| 61-288780 | 12/1986 | Japan . |

OTHER PUBLICATIONS

Patent Abstracts of Japan, vol. 17, No. 383, (E-1400), Jul. 19, 1993 and JP-5-64451, Mar. 12, 1993.

*Primary Examiner*—Matthew V. Nguyen
*Attorney, Agent, or Firm*—Oblon, Spivak, McClelland, Maier, & Neustadt

[57] ABSTRACT

A power conversion system including a single-phase AC power source for generating an AC power. The power conversion system further includes an AC/DC power converter connected to the single-phase AC power source for converting the AC power into a DC power, a main smoothing capacitor connected to DC terminals of the AC/DC power converter, a DC active filter connected in parallel with the main smoothing capacitor for controlling a compensation current flowing in the DC active filter such as to absorb an amount of fluctuation of the AC power supplied from the single-phase AC power source, and a load device connected to the main smoothing capacitor as a DC voltage source for receiving a first DC voltage applied to the main smoothing capacitor.

15 Claims, 19 Drawing Sheets

POWER CONVERSION SYSTEM

BACKGROUND OF THE INVENTION

1. Field of the Invention

This invention relates to a power conversion system wherein AC power of a single-phase AC power source is converted into DC power by a power converter. It more particularly relates to a power conversion system constructed so that compensatory control is performed in order that the power fluctuation of the single-phase AC power source is absorbed on the DC side.

2. Description of the Related Art

FIG. 19 is a layout diagram showing an example of a power conversion system conventionally employed for electric vehicles etc. which receive AC power from AC feeder line. In the drawing, SUP is a single-phase AC power source (single-phase power source), LS is an AC inductor, CNV is a pulse width modulation control converter (PWM converter) that converts the AC power to DC power, Cdo is a DC smoothing capacitor, INV is a pulse width modulation control inverter (PWM inverter) that converts the DC power to AC power, and IM is a three-phase induction motor.

The control circuit is constituted of: a DC voltage detector ISO, an input current detector CTS, an AC voltage detector PTS, motor current detectors CTU, CTV and CTW, a DC voltage control circuit AVR, an input current control circuit ACRS, a pulse width modulation control circuit PWMC1 for PWM converter CNV, a speed detector PG, a speed control circuit SPC, a load current control circuit ACRL, and a pulse width modulation control circuit PWMC2 for PWM inverter INV.

PWM converter CNV controls an input current Is that is supplied from single-phase AC power source SUP such that a voltage Vd that is applied to DC smoothing capacitor Cdo is practically constant. At this point, power conversion can be achieved with little higher harmonics and with an input power factor of 1, by controlling input current Is to a sine wave of the same phase as a power source voltage Vs.

Using DC smoothing capacitor Cdo as DC voltage source, PWM inverter INV converts the DC voltage into a three-phase AC power of variable voltage and variable frequency, and drives induction motor IM by the three-phase AC power. The 300-class electric train "Nozomi" used on the Tokaido Shinkansen Railway is an example of such a system, in which AC power is fed from single-phase AC power source SUP. The AC power is converted into DC power, and the DC power is again converted into AC power for driving induction motor IM.

PWM converter CNV has been described in Transactions of the Institute of Electrical Engineers of Japan, vol. 107-D No. 3, 1987, "Consideration on High Quality AC Traction Motor Drives using PWM converters". PWM inverter INV is well known to those skilled in the art, so that, the detailed description of PWM converter CNV and PWM inverter INV may be omitted.

The prior art power conversion system described is subject to the following problems.

Specifically, when AC power is fed from single-phase AC power source SUP, the AC power fluctuates with a frequency which is twice that of the power source frequency. As a result, voltage Vd that is applied to DC smoothing capacitor Cdo also fluctuates with a frequency that is twice that of the power source frequency. The magnitude of this voltage fluctuation is proportional to the magnitude of the active power that is output by PWM inverter INV, and inversely proportional to the capacitance of DC smoothing capacitor Cdo.

Consequently, if the capacitance of DC smoothing capacitor Cdo is made larger, the fluctuation of DC voltage Vd obtained by conversion performed by single-phase PWM converter CNV can be reduced. However, this increases the weight and size of the power conversion system, and increases its cost. In particular, in the drive system of an electric vehicle, the weight and size of the power conversion system should desirably be as small as possible. It was therefore necessary to allow a certain degree of DC voltage fluctuation.

However, this fluctuation of DC voltage Vd affects the inverter side, producing fluctuation of the output current of PWM inverter INV. For example, if the frequency of single-phase AC power source SUP is 50 Hz, the fluctuation frequency of DC voltage Vd is 100 Hz. In this case, as the output frequency of PWM inverter INV approaches 100 Hz, the fluctuation of the output voltage becomes large, giving rise to the beat in the current of motor IM. This results in pulsation of the torque generated by motor IM, causing vibration and noise.

Also, the maximum value of the voltage that is applied to the semiconductor devices constituting PWM converter CNV and PWM inverter INV is increased by the amount of the fluctuation of DC voltage Vd, making it necessary to employ semiconductor devices capable of withstanding higher voltages. This increases the weight and size of the device, thereby increasing its cost.

SUMMARY OF THE INVENTION

Accordingly, one object of this invention is to provide a power conversion system in which the fluctuation of the DC voltage produced by power fluctuations of the single-phase AC power source can be eliminated.

Another object of this invention is to provide a power conversion system in which the utilization factor of the power conversion system can be increased.

Still another object of this invention is to provide a power conversion system in which the capacitance of the DC smoothing capacitor can be greatly reduced and the dimensions and weight of the power conversion system as a whole can be reduced.

Another object of this invention is to provide a power conversion system in which the beat phenomenon of the inverter output current is eliminated, thereby motor vibration and noise can be greatly reduced.

These and other objects of this invention can be achieved by providing a power conversion system including a single-phase AC power source for generating an AC power. The power conversion system further includes an AC/DC power converter connected to the single-phase AC power source for converting the AC power into a DC power, a main smoothing capacitor connected to DC terminals of the AC/DC power converter, a DC active filter connected in parallel with the main smoothing capacitor for controlling a compensation current flowing in the DC active filter such as to absorb an amount of fluctuation of the AC power supplied from the single-phase AC power source, and a load device connected to the main smoothing capacitor as a DC voltage source for receiving a first DC voltage applied to the main smoothing capacitor.

With this invention, the power fluctuation of the single-phase AC power source is absorbed by the DC active filter that is provided on the DC side of the AC/DC power converter, so the utilization factor of the power conversion system is increased. This enables the fluctuation of the DC voltage to be eliminated, and enables vibration and noise of the motor to be reduced, and enables the capacitance of the DC-side smoothing capacitor to be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
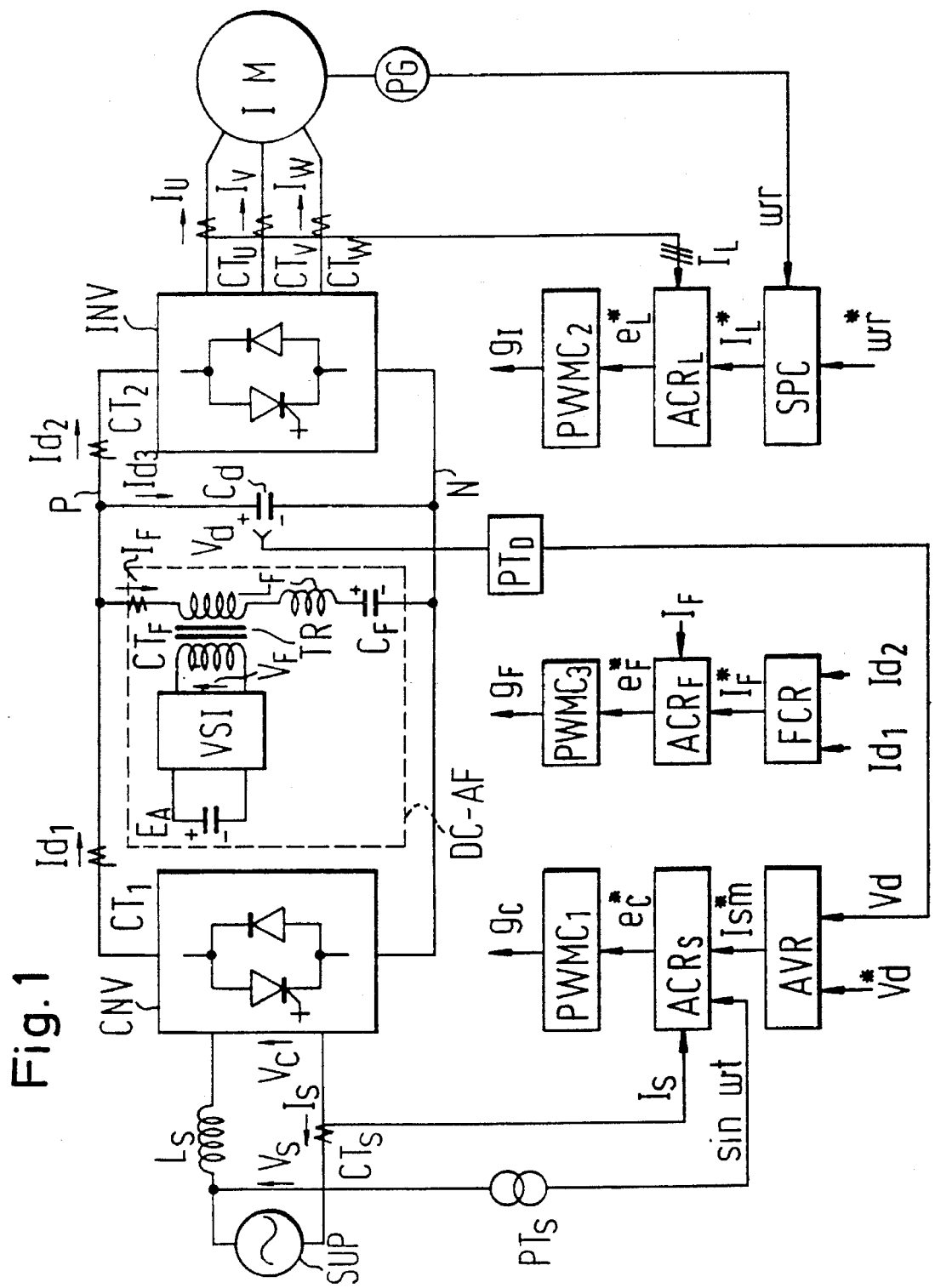
FIG. 1 is a layout diagram showing a first embodiment of a power conversion system according to this invention.

Referring now to the drawings, wherein like reference numerals designate identical or corresponding parts throughout the several views, the embodiments of this invention will be described below.

First of all, an outline of this invention will be described with reference to FIG. 1. In this Figure, SUP is single-phase AC power source (single-phase power source), LS is AC inductor, and CNV is pulse width modulation control converter hereinbelow called PWM converter) constituting an example of an AC/DC power converter, INV is pulse width modulation control inverter (hereinbelow called PWM inverter), IM is three-phase induction motor, Cd is a main smoothing capacitor, and DC-AF is a DC active filter.

Known examples of AC/DC power converters include a diode rectifier or a pulse width modulation control converter (PWM converter). Hereinafter PWM converter CNV will now be described as one example thereof. PWM converter CNV controls current Is that is supplied from single-phase AC power source SUP such as to make DC voltage Vd applied to main smoothing capacitor Cd practically constant. Usually, this input current Is is controlled to be a sine wave of the same phase as voltage Vs of single-phase AC power source SUP, resulting in power conversion with input power factor of 1 and little higher harmonics.

The DC voltage drops when the load device e.g. induction motor IM takes up load. However, DC voltage Vd is controlled to a constant value by exercising control such that active power matching this load is supplied from single-phase AC power source SUP. The load devices comprise three-phase output pulse width modulation control inverter (PWM inverter) INV, and an AC motor (induction motor etc) driven by this inventer INV. In the steady condition in which the rotation speed and the generated torque of the motor are practically constant, the DC current of the three-phase PWM inverter INV is practically constant apart from harmonic components. Most of the DC-side harmonic components of this inventer INV are absorbed by main smoothing capacitor Cd.

However, as described with reference to the prior art power conversion system, the power supplied from single-phase AC power source SUP fluctuates with a frequency of twice the power source frequency, producing fluctuation of the DC voltage.

DC active filter DC-AF is connected in parallel with main smoothing capacitor Cd, and controls a compensating current IF flowing in DC active filter DC-AF so as to absorb the amount of the power fluctuation of single-phase AC power source SUP. A command value IF* of this compensation current IF is given as described below. First, a fluctuation power ΔPC is found by subtracting a mean value Pav of the active power supplied from AC power source SUP from a calculated value PC of the AC-side instantaneous power of PWM converter CNV. Next, by dividing fluctuation power ΔPC by DC voltage Vd, command value IF* is found. That is, $\Delta PC = PC - Pav,$ $IF^* = \Delta PC/Vd$ Since compensation current IF=IF* flows through DC active filter DC-AF, a current originating from the fluctuation of single-phase AC power to main smoothing capacitor Cd is prevented from flowing and fluctuation of DC voltage Vd is therefore eliminated. Main smoothing capacitor Cd can therefore be provided with a capacitance merely sufficient to absorb the harmonic components of the DC side of the PWM converter CNV and three-phase PWM inverter INV, so that the capacitance does not need to be very large.

DC active filter DC-AF is constituted by, for example, a DC constant voltage source EA, a voltage source PWM inverter VSI that converts DC voltage of DC constant voltage source EA to an AC voltage of variable voltage, and a DC smoothing capacitor CF that is connected to the output terminal of inverter VSI. DC active filter DC-AF controls compensation current IF by adjusting the output voltage of inverter VSI. The capacity of PWM inverter VSI that is used in DC active filter DC-AF depends on the capacity of DC smoothing capacitor CF. In other words, if the capacitance of DC smoothing capacitor CF were to be taken as zero, it will be necessary to take the capacity of PWM inverter VSI of DC active filter DC-AF as the same as the capacity of PWM converter CNV. And, if the capacitance of DC smoothing capacitor CF were made infinitely large, the capacity of PWM inverter VSI of DC active filter DC-AF could be made zero.

Taking this into account, the capacitance of DC smoothing capacitor CF is made larger than that of main smoothing capacitor Cd, and is made half, or a smaller fraction, of DC smoothing capacitor Cdo employed in the prior art power conversion system. As a result, the capacity of the PWM inverter VSI of DC active filter DC-AF can be about 10 to 20% of that of PWM converter CNV, so the capacitance of the capacitors of the power conversion system as a whole is reduced, bringing about the considerable advantages to an electric vehicle system in which reduction of weight and size is regarded as important. Furthermore, since fluctuation of DC voltage Vd is eliminated, a higher DC voltage can be employed, as a result of which increase in output capacity of PWM converter CNV and PWM inverter INV can be anticipated.

FIG. 1 shows a main circuit layout diagram and a control circuit block diagram illustrating a first embodiment of a power conversion system according to this invention.

DC active filter DC-AF is constituted by DC constant voltage source EA, single-phase voltage source PWM inverter VSI, a single-phase transformer TR, an inductor LF and DC smoothing capacitor CF.

Furthermore the control device is constituted of: input current detector CTS, an AC voltage detector PTS, a DC voltage detector PTD, DC current detectors CT1, CT2, CTF, load current detectors CTU, CTV, CTW, speed detector PG, DC voltage control circuit AVR, input current control circuit ACRS, PWM control circuit PWMC1 for PWM converter CNV, speed control circuit SPC, load current control circuit ACRL, PWM control circuit PWMC2 for three-phase PWM inverter INV, a compensation current command circuit FCR, a compensation current control circuit ACRF, and a PWM control circuit PWMC3 for single-phase voltage source PWM inverter VSI.

PWM inverter INV uses, as its DC voltage source, main smoothing capacitor Cd, and supplies three-phase AC power of variable voltage and variable frequency to induction motor IM.

In more detail, a rotation speed $\omega r$ of motor IM is detected by speed detector PG and is input to speed control circuit SPC. Speed control circuit SPC compares a speed command value $\omega r^*$ with speed detected value $\omega r$, and generates a three-phase load current command value IL* corresponding to a deviation $\epsilon r = \omega r^* - \omega r$ of these two values $\omega r^*$ and $\omega r$.

Load current control circuit ACRL compares the three-phase load currents IL (IU, IV, IW) detected by current detectors CTU, CTV, CTW with three-phase load current command values IL* (IU*, IV*, IW*), and supplies three-phase voltage command values eL* (eU*, eV*, eW*) corresponding to the deviations of these to PWM control circuit PWMC2.

PWM control circuit PWMC2 outputs gate signals gI to switching devices in PWM inverter INV based on three-phase voltage command values eL*. As a result, three-phase PWM inverter INV generates three-phase voltages VL (VU, VV, VW) proportional to these three-phase voltage command values eL*, and thereby controls three-phase load currents IL.

It is known that the output characteristic similar to the DC motor output characteristic can be obtained by vector control of induction motor IM, but, since this is not the main point of this invention, a detailed description of this will be omitted.

Three-phase PWM inverter INV and induction motor IM, when seen from the DC voltage source (main smoothing capacitor CD), can be regarded as a sort of constant current source flowing a DC current Id2, if harmonic components are neglected.

PWM converter CNV controls input current Is such that voltage Vd applied to main smoothing capacitor Cd is practically constant. In this process, since input current Is is controlled to a sine wave of the same phase (or opposite phase) to power source voltage Vs, operation can be achieved with an input power factor of 1.

Specifically, voltage Vd of main smoothing capacitor Cd is detected by DC voltage detector PTD and is input to voltage control circuit AVR, where voltage Vd is compared with a voltage command value Vd* to find a deviation $\epsilon V = Vd^* - Vd$, which is amplified to find a peak value command Ism* for input current Is.

Also, voltage Vs of single-phase power source SUP is detected by voltage detector PTS and a unit sine wave sin $\omega t$ synchronized with voltage Vs is found. Unit sine wave sin $\omega t$ is multiplied with current peak value command Ism* to obtain an input current command value Is*. Specifically:

$$Is^* = Ism^* \cdot \sin \omega t$$

Input current control circuit ACRS compares current command value Is* with input current Is detected by current detector CTS, to find a deviation $\epsilon I = Is^* - Is$, which is then amplified (-k1 times), to obtain an input signal eC* to PWM control circuit PWMC1 for converter CNV. PWM control circuit PWMC1 outputs gate signals gC to switching devices in PWM converter CNV based on input signal eC*.

PWM converter CNV generates on the AC side a voltage VC proportional to input signal eC* and controls input current Is. AC inductor LS is supplied with the difference voltage VLS=Vs−VC of source voltage Vs and converter voltage VC.

For example, when Is*>Is, deviation $\epsilon I$ has a positive value, and input signal eC* of PWM control circuit PWMC1 has a negative value. Consequently, voltage VLS applied to AC inductor LS is increased, and input current Is is increased. In contrast, when Is*<Is, deviation $\epsilon I$ has a negative value, and input signal eC* assumes a positive value. Consequently, voltage VLS applied to AC inductor LS is decreased, and input current Is is decreased. Consequently, input current Is is controlled such that it coincides with current command value Is*. In this case, for current command value Is*, a sine wave of the same phase as power source voltage Vs is supplied, and input current Is is also controlled so as to track current command value Is*. Thus, operation with an input power factor equal to 1 and with little harmonics can be achieved.

DC voltage Vd is controlled as follows.

For example, when Vd*>Vd, deviation εV assumes a positive value, and current peak value command Ism* is increased with a positive value. As a result, power PS=Vs·Is that is supplied from single-phase AC power source SUP becomes a positive value, and power PS is supplied to main smoothing capacitor Cd, increasing DC voltage Vd. In the opposite case, when Vd*<Vd, deviation εV assumes a negative value, and current peak value command Ism* takes a negative value. As a result, the energy stored in main smoothing capacitor Cd is regenerated in single-phase AC power source SUP, and DC voltage Vd is decreased. In this way, DC voltage Vd is controlled so that it coincides with voltage command value Vd*.

FIG. 2 shows an example of a voltage/current vector diagram of single-phase power source SUP side of the power conversion system of FIG. 1.

Figure 2A:
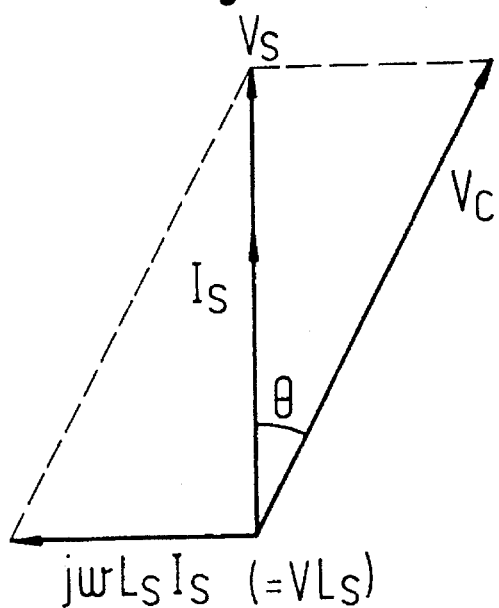
FIGS. 2(a)–(b) are voltage/current vector diagrams given in explanation of the operation of the power conversion system shown in FIG. 1.

FIG. 2(a) shows a vector diagram for the case of power running of the vehicle. Input current Is is flowing, which causes voltage VLs=jω·Ls·Is to be applied to AC inductor Ls. Voltage VC Generated by PWM converter CNV is as shown in the Figure. In this case, a magnitude VCm of voltage VC and a phase angle θ(lag) are expressed by the following equations:

$$VCm = (Vsm^2 + VLsm^2)^{1/2}$$

$$\theta = \tan^{-1}(VLsm/Vsm)$$

Where $$Vs = Vsm \cdot \sin \omega t$$

$$Is = Ism \cdot \sin \omega t$$

and $$VLsm = \omega \cdot Ls \cdot Ism.$$

Figure 2B:
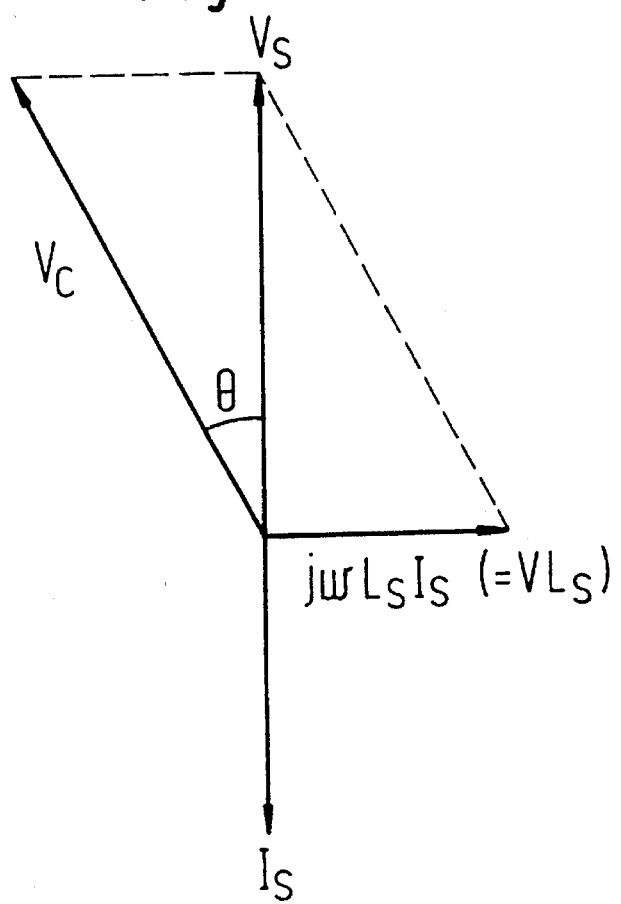

FIG. 2(b) is a vector diagram showing the case of regenerative operation. Input current Is is controlled to be in inverse phase with respect to the power source voltage Vs. Since the phase of voltage VLs that is applied to AC inductor Ls is inverted, phase angle θ of voltage VC that is generated by PWM converter CNV is advanced.

Figure 3:
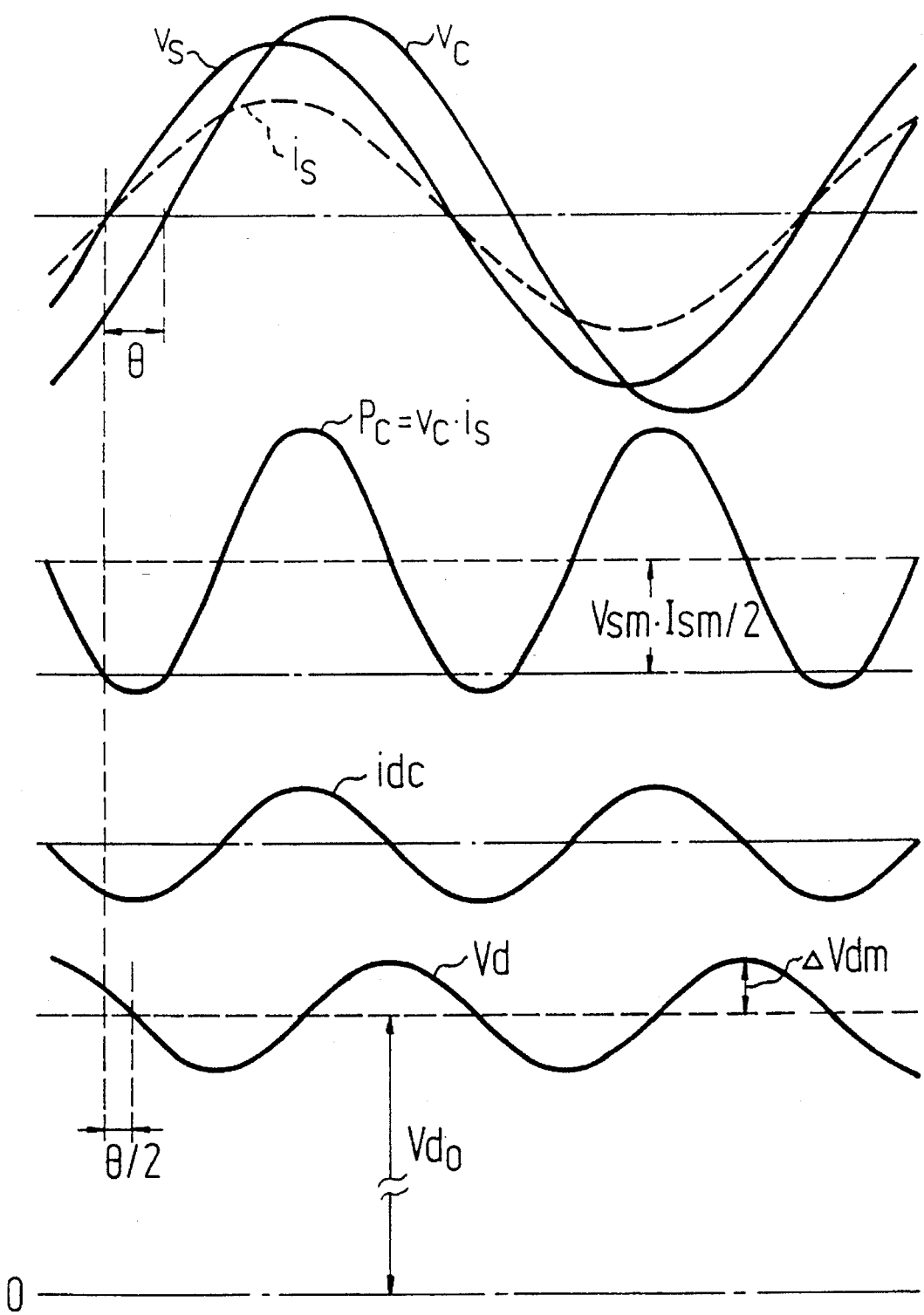
FIG. 3 is a waveform diagram of the voltage, current and power of the various units, given in explanation of the operation of the power conversion system shown in FIG. 1.

FIG. 3 is a diagram showing voltage and current waveforms during power running of PWM converter CNV of the power conversion system of FIG. 1. Input current Is is controlled in the same phase as power source voltage VS, and the voltage VC generated by PWM converter CNV lags by phase angle θ from power source voltage VS. An instantaneous power PS that is supplied from single-phase AC power source SUP is:

$$\begin{aligned} PS &= VS \cdot is \\ &= Vsm \cdot \sin \omega t \times Ism \cdot \sin \omega t \\ &= (Vsm \cdot Ism/2) \cdot (1 - \cos 2\omega t) \end{aligned}$$

Instantaneous power PS fluctuates with a frequency of twice that of single-phase AC power source SUP. Also, an instantaneous power PC of PWM converter CNV is the product of voltage VC generated by PWM converter CNV and current Is, and so shows considerable fluctuation, corresponding to the amount of the voltage drop of AC inductor Ls.

Specifically, $$\begin{aligned} PC &= VC \cdot IS \\ &= VCm \cdot \sin(\omega t - \theta) Ism \cdot \sin \omega t \\ &= (VCm \cdot Ism/2) \cdot \{\cos \theta - \cos(2\omega t - \theta)\} \end{aligned}$$

Since VCm=Vsm/cos θ holds, mean value Pav of the active power is:

$$Pav = Vsm \cdot Ism/2$$

In the steady condition, active power Pav is equal to a power PL consumed by the load device (PWM inverter INV+ induction motor IM), and power fluctuation ΔPC flows in and out of main smoothing capacitor Cd. That is, $$\begin{aligned} \Delta PC &= PC - PL \\ &= -(VCm \cdot Ism/2) \cdot \cos(2\omega t - \theta) \end{aligned}$$

A current idc flowing in main smoothing capacitor Cd can thus be approximated by the following equation, taking the mean value of DC voltage Vd as being Vdo.

$$\begin{aligned} idc &= \Delta PC/Vdo \\ &= -(VCm \cdot Ism/2\ Vdo) \cdot \cos(2\omega t - \theta) \\ &= -\{Pav/(Vdo \cdot \cos \theta)\} \cdot \cos(2\omega t - \theta) \end{aligned}$$

The amount of fluctuation ΔVd of DC voltage Vd is therefore given by the following calculation formula:

$$\begin{aligned} \Delta Vd &= \int (1/Cd) \cdot idc\, dt \\ &= -\{Vcm \cdot Ism/(4 \cdot Vdo \cdot \omega \cdot cd)\} \cdot \sin(2\omega t - \theta) \\ &= -\{Pav/(2 \cdot \cos \theta \cdot Vdo \cdot \omega \cdot Cd)\} \cdot \sin(2\omega t - \theta) \\ &= -Vdm \cdot \sin(2\omega t - \theta) \end{aligned}$$

Specifically, the magnitude of DC voltage fluctuation ΔVd is proportional to active power PL taken up by the load device, where PL=Pav=Vsm·Ism/2, and is inversely proportional to the capacitance of main smoothing capacitor Cd. For example, when PL=3,000 [kW], Vdo=2,000 [V], f= ω/(2π)=50 [Hz], Cd=0.02 [F] and cos θ=0.9, the magnitude of ΔVd is ΔVdm=132.6 [V].

Figure 4:
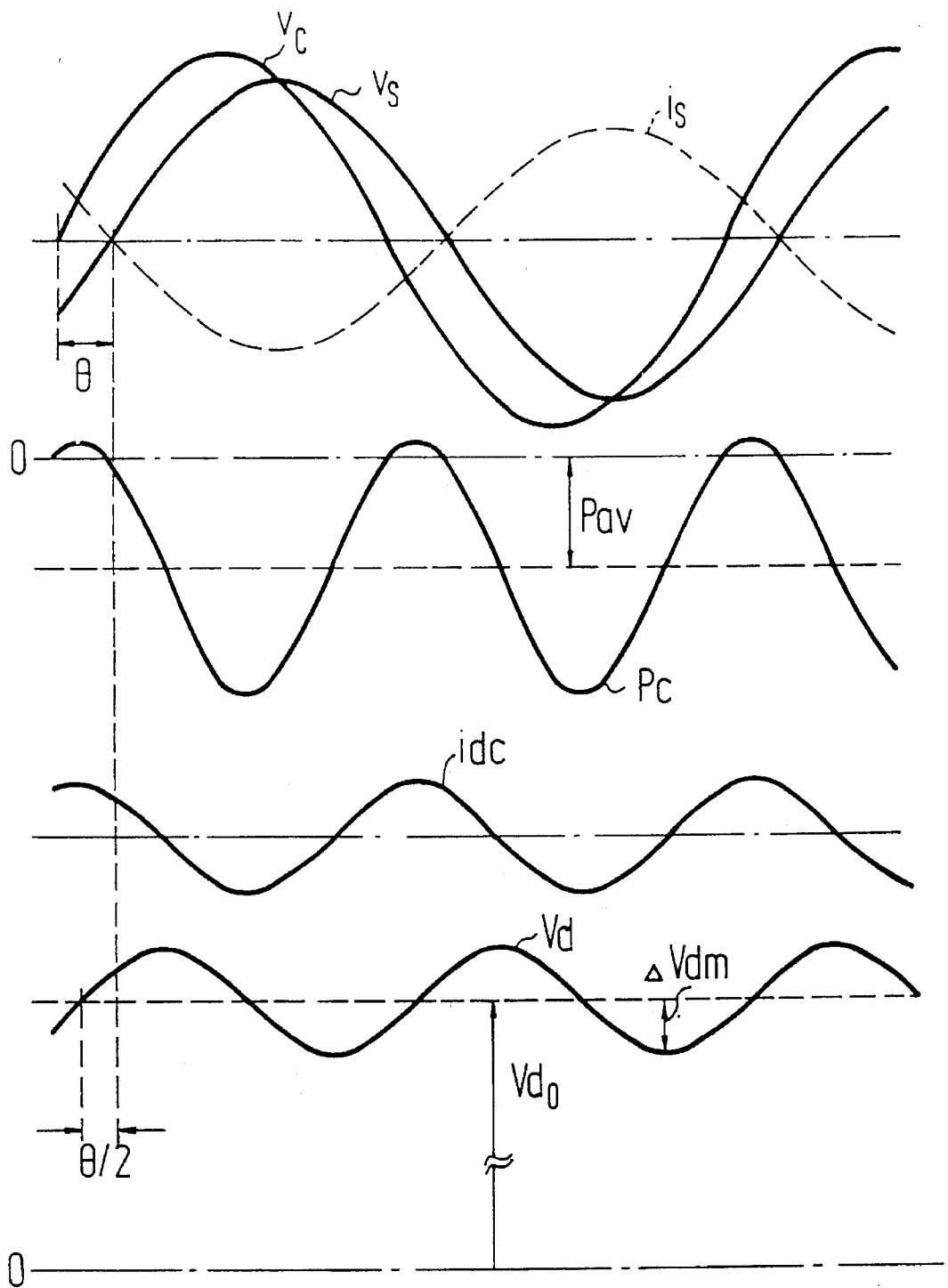
FIG. 4 is a waveform diagram of the voltage, current and power of the various units given in explanation of the operation of the power conversion system shown in FIG. 1.

FIG. 4 shows voltage and current waveforms of the various units under regenerative operation. Voltage VC generated by PWM converter CNV is advanced by phase angle from power source voltage VS.
Consequently, $$\begin{aligned} PC &= VC \cdot IS \\ &= VCm \cdot \sin(\omega t + \theta) \times Ism \cdot \sin(\omega t + \pi) \\ &= -(VCm \cdot Ism/2) \cdot \{\cos \theta - \cos(2\omega t + \theta)\} \end{aligned}$$

Since VCm=Vsm/cos θ, active power Pav coincides with power PL regenerated from the load device (PWM inverter INV+ induction motor IM), and power fluctuation ΔPC is input and output from main smoothing capacitor Cd. Specifically, $$\begin{aligned} \Delta PC &= PC - PL \\ &= (VCm \cdot Ism/2) \cdot \cos(2\omega t + \theta) \end{aligned}$$

Thus, current idc flowing in main smoothing capacitor Cd can be approximated by the following expression, where the mean value of DC voltage Vd is taken as Vdo.

$$\begin{aligned}
idc &= \Delta PC/Vdo \\
&= (VCm \cdot Ism/2Vdo) \cdot \cos(2\omega t + \theta) \\
&= \{Pav/(Vdo \cdot \cos\theta)\} \cdot \cos(2\omega t + \theta)
\end{aligned}$$

Consequently, the amount of fluctuation $\Delta Vd$ of the DC voltage $Vd$ is:

$$\begin{aligned}
\Delta Vd &= \int (1/Cd) idc\, dt \\
&= \{Vcm \cdot Ism/(4 \cdot Vdo \cdot \omega \cdot Cd)\} \cdot \sin(2\omega t + \theta) \\
&= \{Pav/(2 \cdot \cos\theta \cdot Vdo \cdot \omega \cdot Cd)\} \cdot \sin(2\omega t + \theta) \\
&= \Delta Vdm \cdot \sin(2\omega t + \theta)
\end{aligned}$$

Next, the control action of DC active filter DC-AF of the power conversion system of FIG. 1 will be described.

First of all, DC output current Id1 of single-phase PWM converter CNV and DC input current Id2 of three-phase PWM inverter INV are detected by respective current detectors CT1, CT2, and are input to compensation current command circuit FCR, where their difference IF* is found. Difference current IF*=Id1–Id2 constitutes the command value of compensation current IF which flows in DG active filter DC-AF. At this point, there is no need for harmonic current components produced by PWM control of PWM converter CNV and/or PWM inverter INV to flow in DC active filter DC-AF, so detected values Id1, Id2 of DC currents are input to compensation current command circuit FCR with the harmonic components removed by a filter.

Compensation current IF flowing into DC active filter DC-AF is detected by current detector CTF and is input to current control circuit ACRF. Current control circuit ACRF compares compensation current command value IF* with compensating current detection value IF to find a deviation $\epsilon F=IF^*-IF$. Deviation $\epsilon F$ is then inverted and amplified and supplied to PWM control circuit PWMC3 as voltage command value eF*. PWM control circuit PWMC3 outputs gate signals gF to switching devices in voltage source PWM inverter VSI based on voltage command value eF*. As a result, voltage source PWM inverter VSI controls compensation current IF by generating a voltage VF that is proportional to voltage command value eF*.

Specifically, when IF*>IF, deviation $\epsilon F$ assumes a positive value, as a result of which voltage command value eF* assumes a negative value, and output voltage VF takes a negative value. The compensation current IF is therefore increased, and control is effected such that IF=IF*.

In the opposite case, when IF*<IF, deviation $\epsilon F$ assumes a negative value, voltage command value eF* becomes a positive value, and output voltage VF takes a positive value. As a result, compensation current IF is decreased. Thus, control is still exercised such that IF=IF*.

Figure 5:
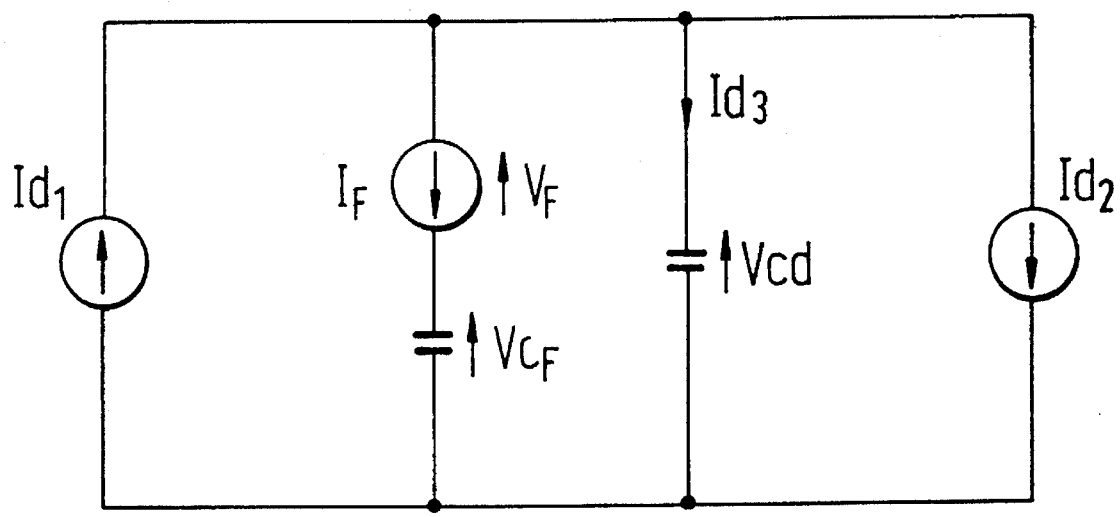
FIG. 5 is an equivalent circuit diagram given in explanation of the operation of the power conversion system of FIG. 1.

FIG. 5 shows an equivalent circuit of the power conversion system of FIG. 1. PWM converter CNV and PWM inverter INV can be represented as current sources. Specifically, neglecting the harmonic current produced by PWM control, input current Id2 of PWM inverter INV includes only a DC component IC, and output current Id1 of PWM converter CNV includes DC component IC and AC component idc that varies with a frequency that is twice the power source frequency. A current Id3 flowing in main smoothing capacitor Cd then becomes zero, since compensation current IF=idc flows through DC active filter DC-AF. More precisely, since compensation current IF does not contain harmonic current, harmonic current flows into main smoothing capacitor Cd. However, since the frequency is high, the capacitance of main smoothing capacitor Cd can be made much smaller, while still practically entirely eliminating voltage fluctuations.

Figure 6A:
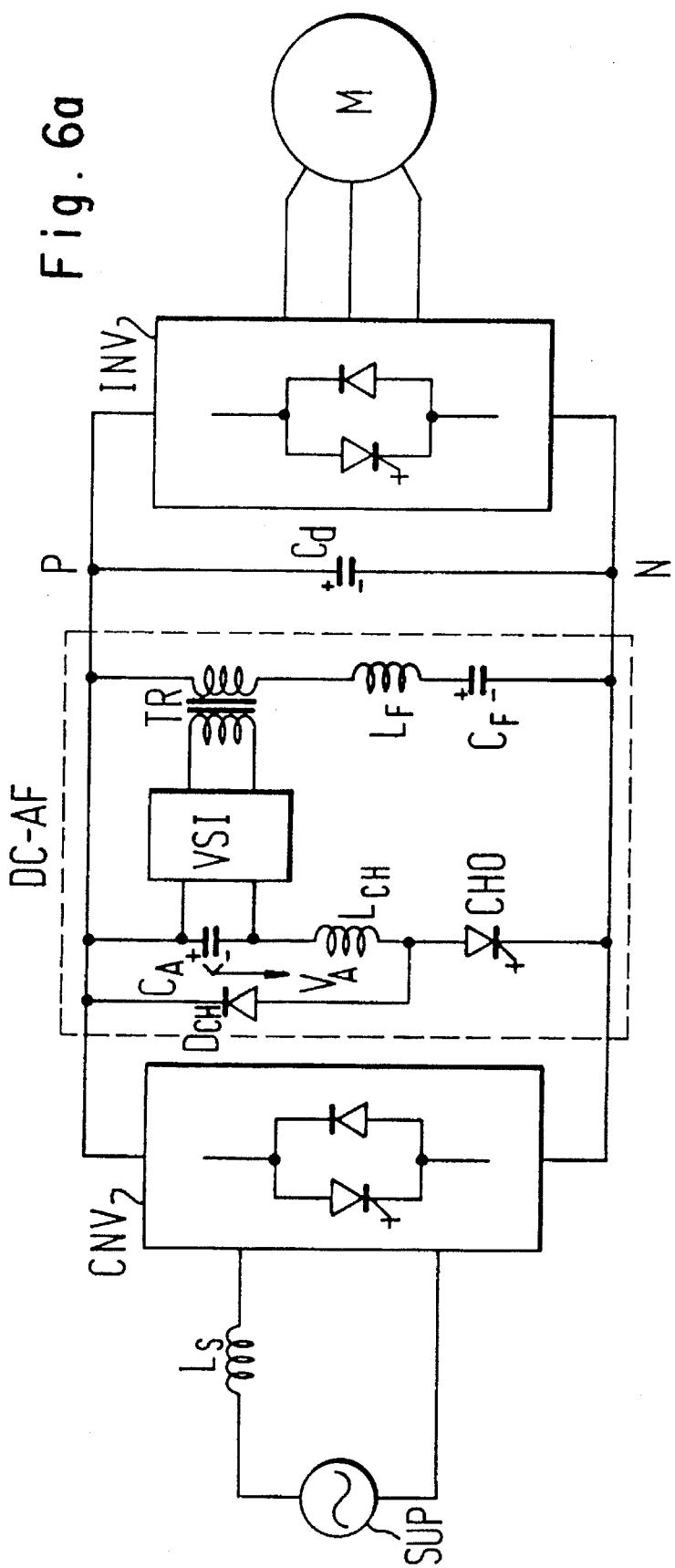
FIG. 6 is layout diagram showing a second embodiment of a power conversion system according to this invention.

FIG. 6 is a layout diagram showing a second embodiment of a power conversion system according to this invention. In FIG. 6(a), SUP is single-phase AC power source (single-phase power source), CNV is PWM converter, DC-AF is DC active filter, Cd is main smoothing capacitor, INV is three-phase PWM inverter, and M is an AC motor.

DC active filter DC-AF is constituted by: transformer TR, inductor LF, DC smoothing capacitor CF, single-phase voltage source PWM inverter VSI, a DC capacitor CA, a DC inductor LCH, a switching device CHO, and a freewheeling diode DCH. Switching device CHO, freewheeling diode DCH and DC inductor LCH compose a DC chopper.

Figure 6B:
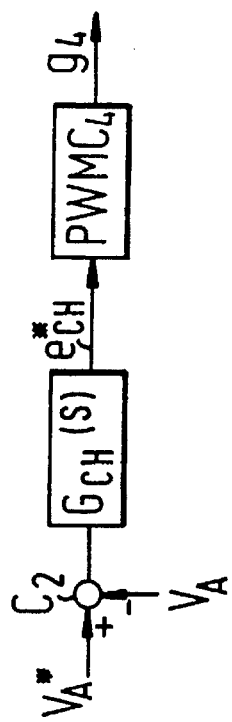

The point of difference in DG active filter DG-AF from the embodiment of FIG. 1 is that a voltage VA that is applied to DC capacitor CA by the DC chopper is controlled to be constant, and DC capacitor CA is taken as the voltage source of single-phase voltage source PWM inverter VSI. The operation of this DC chopper is described below. The DC chopper control circuit, as shown in FIG. 6(b), is constituted of a comparator C2, a voltage control compensation circuit GCH (S), and a PWM control circuit PWMC4.

First of all, voltage VA that is applied to DC capacitor CA is detected and input to comparator C2. Comparator C2 compares a voltage command value VA* with voltage detection value VA to obtain a deviation $\epsilon A=VA^*-VA$, which is then input to voltage control compensation circuit GCH(S). Voltage control compensation circuit GCH(S) amplifies deviation $\epsilon A$ to produce a voltage command value eCH*, which is then input to PWM control circuit PWMC4. PWM control circuit PWMC4 is an ordinary pulse width modulation control circuit for triangular wave comparison, and outputs a gate signal g4 to switching device CHO in DC chopper based on voltage command value eCH*.

When VA*>VA, deviation $\epsilon A$ assumes a positive value, causing voltage command value eCH* to increase, and the ON period of switching device CHO to lengthen. As a result, the current that charges DC capacitor CA is increased, increasing applied voltage VA, and effecting control such that VA=VA*.

In the opposite situation, when VA*<VA, deviation $\epsilon A$ assumes a negative value, decreasing voltage command value eCH*, and shortening the ON period of switching device CHO. As a result, control is likewise exercised such that VA=VA*, by decreasing the current with which DC capacitor CA is charged, thereby decreasing applied voltage VA.

As described above with DC active filter DC-AF in FIG. 1, DC active filter DC-AF in FIG. 2 also passes compensation current IF such that voltage Vd applied to main smoothing capacitor Cd becomes constant. Thanks to the inflow of compensation current IF into DC smoothing capacitor CF, a voltage VCF applied to DC smoothing capacitor CF fluctuates. So, it can be considered that a voltage opposite to this fluctuation amount of voltage VCF is then generated in single-phase voltage source PWM inverter VSI, and the voltage applied to main smoothing capacitor Cd is maintained constant. Voltage VF that is generated by single-phase voltage source PWM inverter VSI and compensation current IF have a phase difference of practically 90°, so usually there is scarcely any input or output of active power to or from single-phase voltage source PWM inverter VSI. Consequently, the DC chopper of the power conversion system of FIG. 6 can have a capacity that is merely sufficient to supply losses of single-phase voltage type PWM inverter VSI and so on.

Due to this construction of the second embodiment of FIG. 6, a lower voltage can be employed for power source voltage VA of DC active filter DC-AF, and a stable voltage source can be obtained.

In the case that the withstand voltage of single-phase voltage source PWM inverter VSI is assured by connecting the two terminals of DC capacitor CA of DC active filter DC-AF in parallel with main smoothing capacitor Cd, DC chopper circuit of FIG. 6 can be dispensed with.

FIG. 7 is a layout diagram showing a third embodiment of a DC active filter DC-AF of a power conversion system according to this invention. It is to be noted that a DC active filter DC-AF in the following embodiments is used to substitute for DC active filter DC-AF in power conversion system of FIG. 1.

Figure 7A:
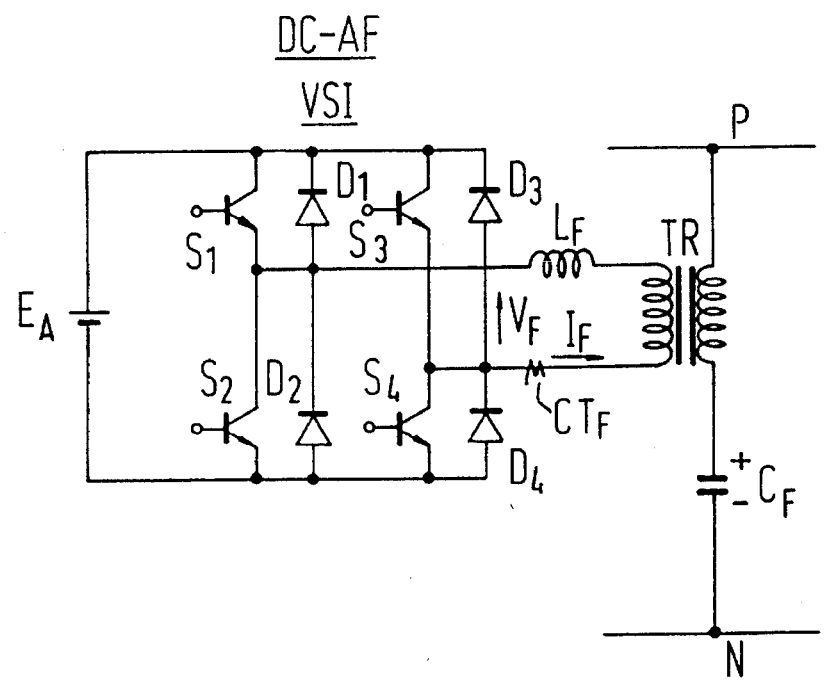
FIGS. 7(a)–(b) are layout diagrams showing a DC active filter of a power conversion system according to a third embodiment of this invention.

In FIG. 7(a), P and N are DC positive and negative terminals of the main circuit, EA is DC voltage source, VSI is single-phase voltage source PWM inverter, TR is single-phase transformer, LF is inductor, and CF is DC smoothing capacitor.

Single-phase voltage source PWM inverter VSI is constituted by switching devices S1 to S4 and freewheeling diodes D1 to D4. Inductor LF is connected to the primary side of single-phase transformer TR. For convenience in explanation, the primary/secondary turn ratio of transformer TR is taken as 1 to 1.

Figure 7B:
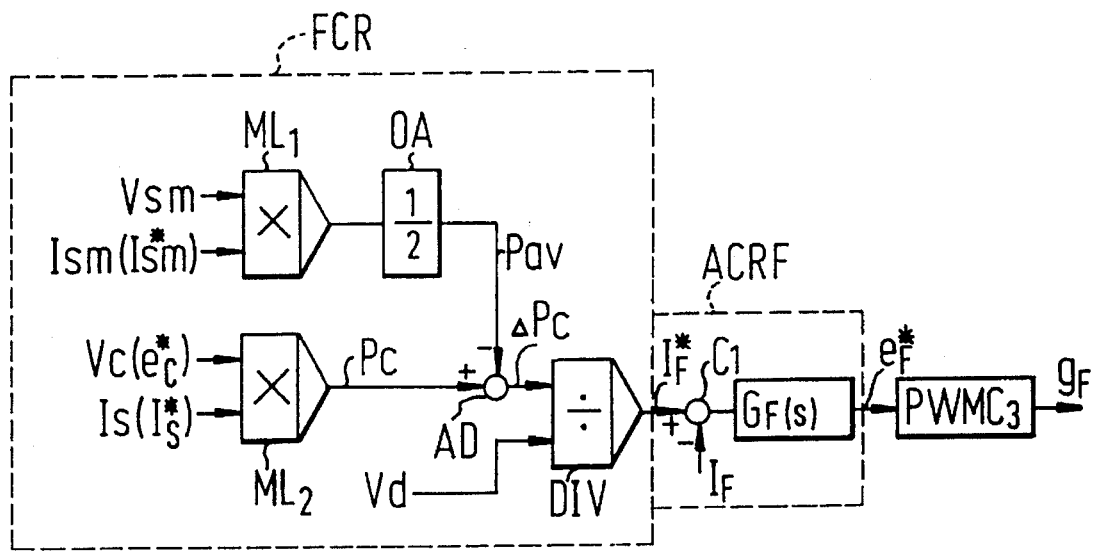

Also, as shown in FIG. 7(b), the control device is constituted by: a current detector CTF, a compensation current command circuit FCR, a compensation current control circuit ACRF, and PWM control circuit PWMC3 for single-phase voltage source PWM inverter VSI. Compensation current command circuit FCR is constituted by multipliers ML1, ML2 a proportional calculator OA, an adder AD and a divider DIV. Compensation current control circuit ACRF is constituted by a comparator C1 and a control compensation circuit GF(S).

The product of AC side voltage VC of PWM converter CNV and input current Is of PWM converter CNV is first of all found by multiplier ML2. Since, at this point, voltage detection value VC contains a lot of harmonic component, PWM control input signal (voltage command value) eC* of PWM converter CNV could be used instead. Likewise, current command value Is* could be used instead of input current detection value Is. The output of multiplier ML2 is instantaneous power PC of PWM converter CNV.

Further, multiplier ML1 calculates the product of power source voltage peak value Vsm and input current peak value Ism. The product is halved by proportional calculator OA to generate a mean value Pav of the active power that is supplied from AC power source SUP. Command value Ism* could be used instead of input current peak value Ism.

Adder AD calculates the value (PC−Pav) to find fluctuation power ΔPC, which is then input to divider DIV. Divider DIV divides fluctuation power ΔPC by DC voltage detection value Vd and this result constitutes command value IF* for compensation current IF.

Compensation current command value IF* that is thus found becomes equal to the amount of fluctuation idc of the DC side current of PWM converter CNV, resulting from power fluctuation ΔPC of single-phase power source SUP.

Compensation current command value IF* is input to comparator C1 of compensation current control circuit ACRF of the next stage, where it is compared with compensation current IF detected by current detector CTF. A deviation ΔF=IF*−IF that is thus found is input to control compensation circuit GF(S), and is inverted and amplified (−KF times) to provide voltage command value eF* for single-phase PWM inverter VSI. The control of the compensation current such that IF=IF* has already been described above, and so the description of this control is omitted.

Thus, by the fact that DC active filter DC-AF flows compensation current IF that is equal of IF* (=idc), the fluctuations of the single-phase power no longer flow into main smoothing capacitor Cd, so the fluctuation voltage can be eliminated.

Figure 8:
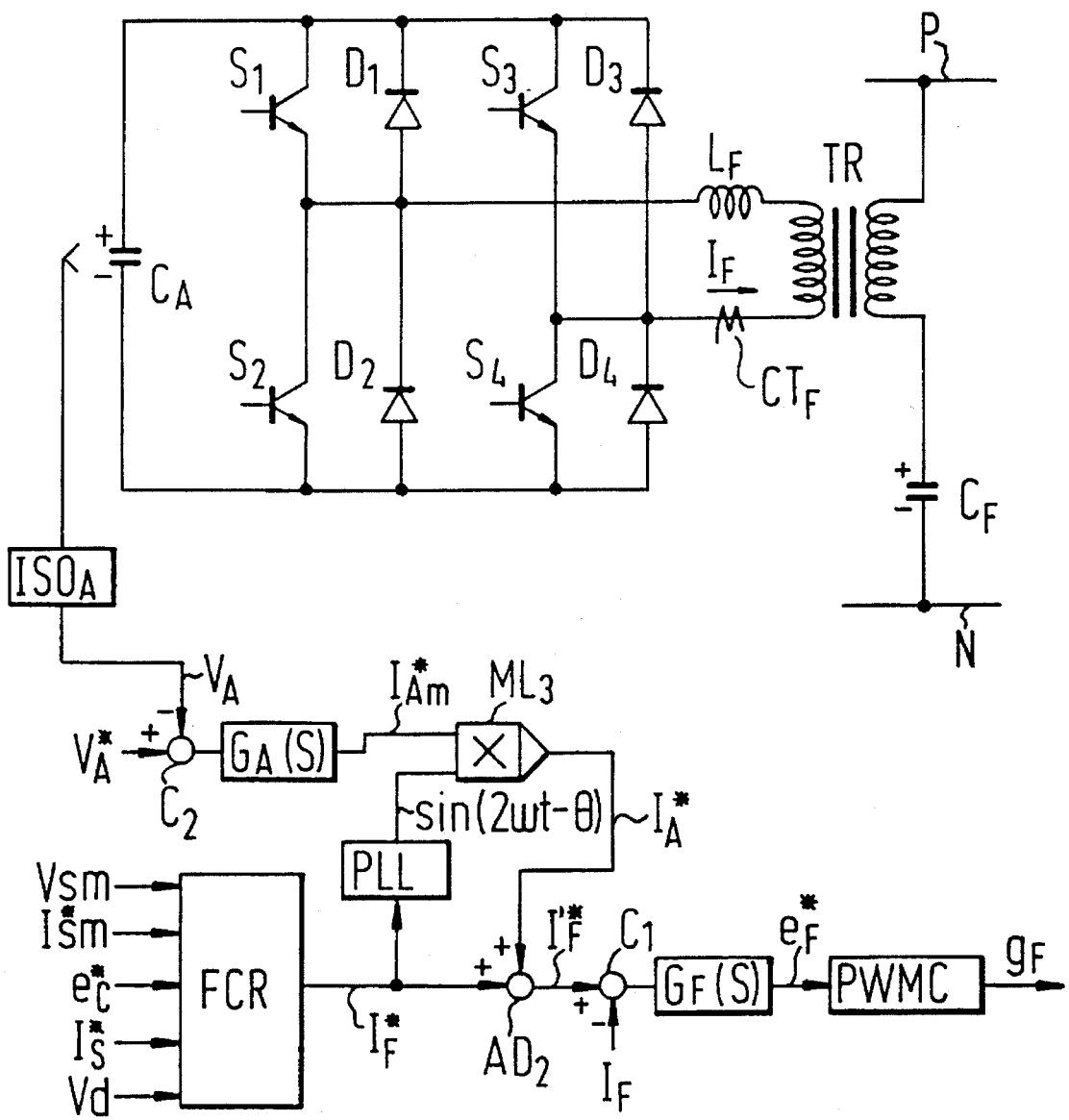
FIG. 8 is a layout diagram showing a DC active filter of a power conversion system according to a fourth embodiment of this invention.

FIG. 8 is a layout diagram showing a fourth embodiment of a DC active filter DC-AF of a power conversion system according to this invention.

In this Figure, the main circuit of DC active filter DC-AF is the same as that of DC active filter DC-AF shown in FIG. 7, except that a smoothing capacitor CA used for a DC power source of DC active filter DC-AF is provided instead of DC voltage source EA.

The control device is constituted of: current detector CTF, a DC voltage detector ISOA, comparators C1 and C2, a voltage control compensation circuit GA(S), compensation current command circuit FCR, a phase synchronization circuit PLL, a multiplier ML3, an adder AD2, current control compensation circuit GF(S) and PWM control circuit PWMC3. Compensation current command circuit FCR is constructed the same way as already described with reference to FIG. 7.

First of all, compensation current command circuit FCR finds compensation current command value IF* indicated by the following formula. Specifically:

$$IF^* = idc = \Delta P/Vd$$
$$= -(VCm \cdot Ism/2Vd) \cdot \cos(2\omega t - \theta)$$

Phase synchronization circuit PLL finds a unit cosine wave $\cos(2\omega t-\theta)$ synchronized with compensation current command value IF*, and outputs a unit sine wave $\sin(2\omega t-\theta)$ obtained by displacing this by phase 90°.

Voltage detector ISOA detects voltage VA of DC capacitor CA, which is input to comparator C2. Comparator C2 compares voltage command value VA* with voltage detection value VA, to obtain a deviation εA=VA*−VA. Deviation εA is inverted and amplified (−KA) by voltage control compensation circuit GA(S) to obtain an output signal IAm*. Multiplier ML3 multiplies output signal IAm* of voltage control compensation circuit GA(S) and output signal $\sin(2\omega t-\theta)$ of phase synchronization circuit PLL, to subsequently obtain a current command value IA*.

$$IA^* = IAm^* \cdot \sin(2\omega t-\theta)$$

Adder AD2 adds current command value IA* and compensation current command value IF* to obtain a new compensation current command value IF'*.

Comparator C1 compares new compensation current command value IF'* with compensation current IF detected by current detector CTF to obtain a deviation εF=IF'*−IF, which is input to current control compensation circuit GF(S). The control of compensation current IF is as described with reference to FIG. 7, so that control is exercised to make IF=IF'*.

Figure 9A:
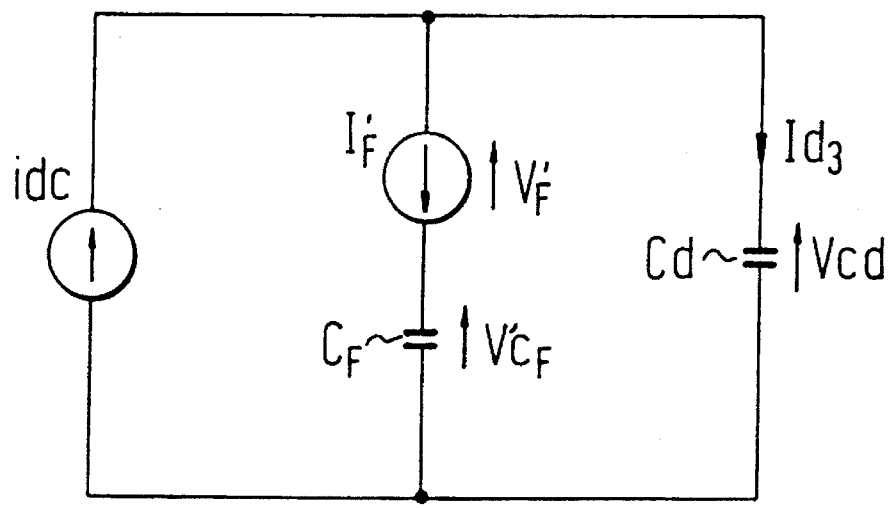
FIGS. 9(a)–(b) are equivalent circuit diagram and voltage/current vector diagram given in explanation of the operation of the DC active filter of FIG. 8.
Figure 9B:
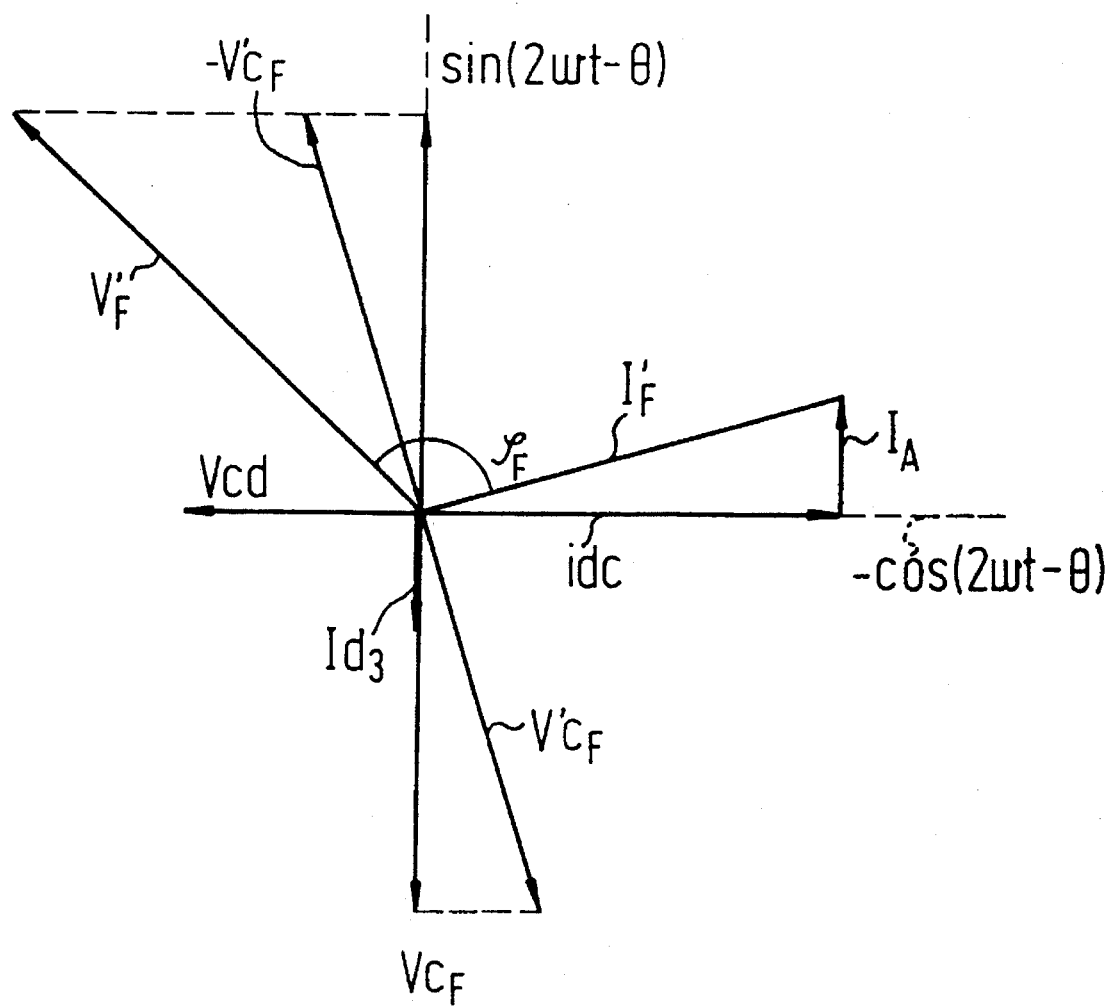

FIG. 9 is a view given in explanation of the operation of the device shown in FIG. 8. FIG. 9(a) shows an equivalent circuit thereof. FIG. 9(b) is a voltage/current vector diagram thereof. FIG. 9 shows only the AC quantities which change with a frequency of twice the power source frequency, and the DC component is excluded.

In the equivalent circuit of FIG. 9(a), idc is a fluctuation component of the DC side generated by PWM converter CNV of FIG. 1. As previously shown, $$idc = -(VCm \cdot Ism/2Vd) \cdot \cos(2\omega t-\theta)$$

Corresponding to this, Dc active filter DC-AF passes a compensation current IF'=IF'* represented by the following equation.

$$\begin{aligned} IF^* &= IF' + IA \\ &= idc + IAm^* \cdot \sin(2\omega t - \theta) \end{aligned}$$

As a result, the voltage VCF' of DC smoothing capacitor CF becomes:

$$\begin{aligned} VCF &= (1/CF)\int IF' \, dt \\ &= -\{VCm \cdot Ism/(4 \cdot Vd \cdot \omega \cdot CF)\} \cdot \\ &\quad \sin(2\omega t + \theta) - \\ &\quad \{IAm^*/(2 \cdot \omega \, CF)\} \cdot \cos(2\omega t - \theta) \end{aligned}$$

As shown in FIG. 9(b), the phase of voltage vector VCF' lags by 90° from the phase of current vector IF'.

Also, in main smoothing capacitor Cd, there flows a current Id3=idc-IF'*=-IA*. Voltage VCd of main smoothing capacitor Cd becomes:

$$\begin{aligned} VCd &= (1/Cd)\int Id3 \, dt \\ &= \{IAm^*/(2 \cdot \omega \cdot Cd)\} \cdot \cos(2\omega t - \theta) \end{aligned}$$

giving a voltage vector VCd as shown in FIG. 9(b).

Here, if the positive direction of voltage VF' generated by DC active filter DC-AF is taken in the direction of the arrow in FIG. 9(a), $$VF'=VCd-VCF'$$

holds, and voltage VF' is shown as the voltage vector VF' of FIG. 9b. Taking the phase difference between voltage vector VF' and current vector IF' as being $\phi F$, active power PA flowing into DC active filter DC-AF is:

$$PA=IF' \cdot VF' \cdot \cos \phi F$$

If IAm* has a positive value, $\phi F>90°$, PA has a negative value, and the stored energy of DC capacitor CA is decreased. In contrast, if IAm* has a negative value, $\phi F$ becomes smaller than 90°, so PA has a positive value, and the stored energy of DC capacitor CA is increased.

In regeneration operation, the phase of fluctuation current idc of the DC side of PWM converter CNV is inverted, so the input/output of this energy is the opposite to that described above.

The control operation of voltage VA that is applied to DC capacitor CA of DC active filter DC-AF will now be described, returning to FIG. 8. The case will be described in which the PWM converter CNV of the device of FIG. 1 is in power running.

When VA*>VA, deviation $\epsilon A$ has a positive value, which is multiplied by $-KA$ times, so that current peak value IAm* has a negative value. Consequently, the current vector IA of FIG. 9(b) is in the opposite direction, so phase angle $\phi F$ is smaller than 90°, and active power PA flowing into DC active filter DC-AF has a positive value, so that the stored energy of DC capacitor CA is increased. As a result, voltage VA of DC capacitor CA is increased, and control is effected such that VA=VA*.

In the opposite situation, when VA*<VA, deviation $\epsilon A$ assumes a negative value, which is then multiplied by $-KA$ times, so that current peak value IAm* has a positive value. Consequently, current vector IA is as shown in FIG. 9(b), with phase angle $\phi F>90°$. Active power PA flowing into DC active filter DC-AF thus has a negative value, and the stored energy of DC capacitor CA is reduced. As a result, voltage VA of DC capacitor CA is decreased, so that control is likewise effected such that VA=VA*.

During regenerative operation, control can be exercised to make VA=VA* by inverting the sign of output signal of voltage control compensation circuit GA(S) of FIG. 8.

With DC active filter DC-AF of FIG. 8, a more economic system can be achieved by using DC capacitor CA as DC voltage source EA. Also, if required, single-phase transformer TR can be dispensed with, because DC terminals P, N of the main circuit can be isolated and electrically insulated from the DC power source of DC active filter DC-AF.

Figure 10:
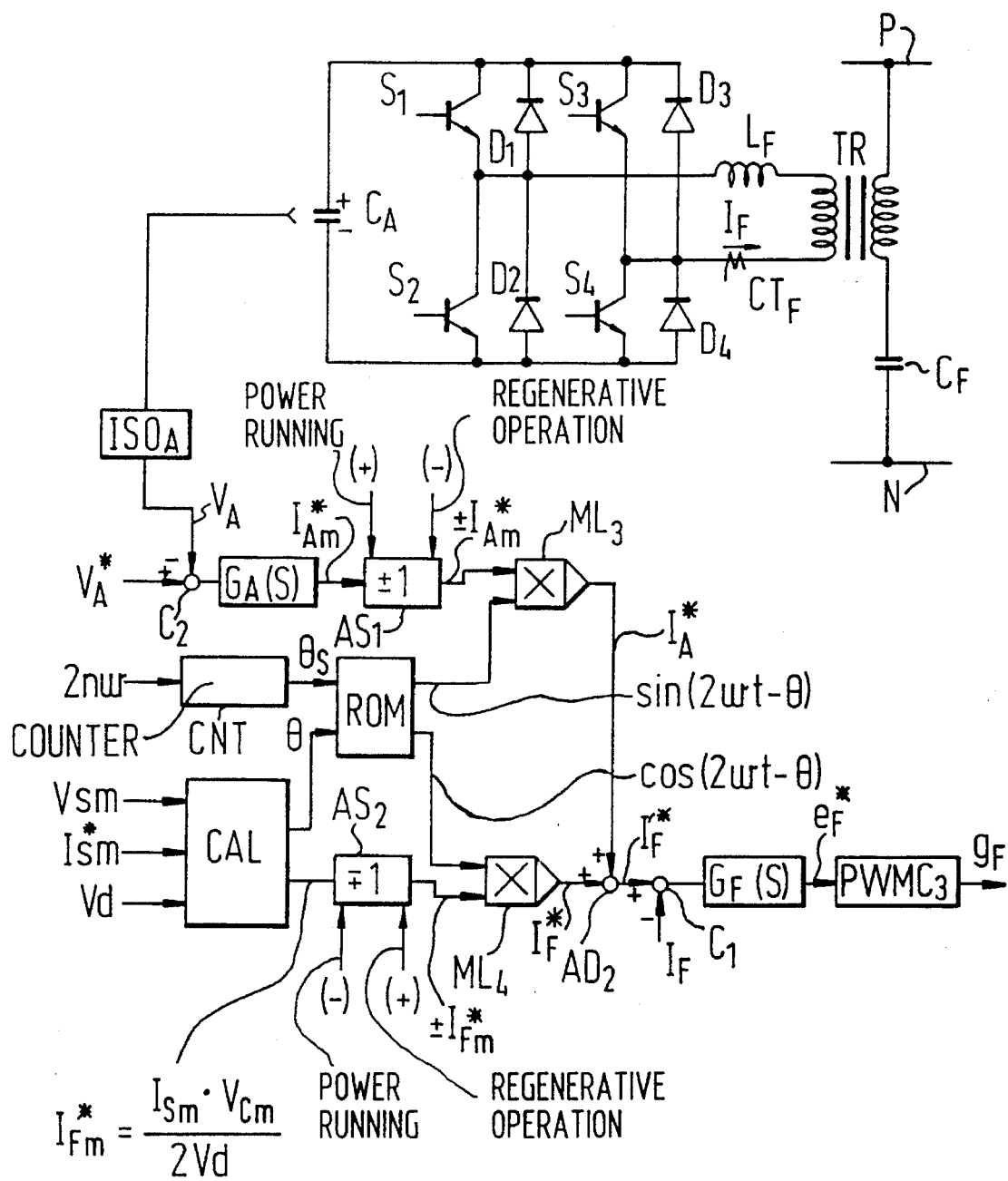
FIG. 10 is a layout diagram showing a DC active filter of a power conversion system according to a fifth embodiment of the invention.

FIG. 10 is a layout diagram showing a fifth embodiment of a DC active filter DC-AF of a power conversion system according to this invention.

In this Figure, the main circuit of DC active filter DC-AF is the same as that shown in FIG. 8.

Control device is constituted by: current detector CTF, DC voltage detector ISOA, comparators C1, C2, voltage control compensation circuit GA(S), sign inverters AS1, AS2, multipliers ML3, ML4, a calculating circuit CAL, a counter CNT, a memory table ROM, adder AD2, current control compensation circuit GF(S), and PWM control circuit PWMC3.

First of all, detected value Vsm of voltage peak value of single-phase power source SUP, input current peak value command Ism* and DC voltage detected value Vd are input to calculating circuit CAL, so that compensation current peak value command IFm* and phase angle $\theta$ shown in FIG. 2 can be calculated as follows.

$$VLSm=\omega \cdot LS/Ism^*$$

$$VCm=(Vsm^2 + VLSm^2)^{1/2}$$

$$\theta = \tan^{-1}(VLSm/Vsm)$$

$$IFm^*=Ism^* \cdot VCm/(2 \cdot Vd)$$

Compensation current peak value command IFm* thus calculated is input to multiplier ML4 through sign inverter AS2. When PWM converter CNV is in power running (Ism*>0) sign inverter AS2 outputs signal $-IFm^*$ by inverting input signal IFm*: in the case of regenerative operation (Ism<0) input signal IFm* is output from sign inverter AS2 unchanged.

Calculating circuit CAL outputs phase angle $\theta$ thus calculated to memory table ROM. Counter CNT is actuated by a clock frequency of 2n times the power source angular frequency $\omega$ and outputs its count value $\theta s=2\omega t$ to memory table ROM. Memory table ROM calculates a phase angle $(2\omega t-\theta)$ as a phase address. Memory table ROM stores sine wave values and cosine wave values corresponding to the phase address PS, and so outputs a unit sine wave $\sin(2\omega t-\theta)$ and a unit cosine wave $\cos(2\omega t-\theta)$ corresponding to inputted phase angle $(\theta s-\theta)$.

Also, voltage detector ISOA detects voltage VA of DC capacitor CA, and inputs this to comparator C2. Comparator C2 compares voltage command value VA* and voltage detection Value VA, finding a deviation $\epsilon A=VA^*-VA$. Deviation $\epsilon A$ is subsequently inverted and multiplied by ($-KA$ times) by voltage control compensation circuit GA(S) to obtain current peak value command IAm*. Current peak value command IAm* is input to multiplier ML3 through sign inverter AS1. When PWM converter CNV is in power running (Ism*>0) sign inverter AS1 outputs input signal IAm* unaltered; in the case of regenerative operation (Ism*<0) the sign of input signal IAm* is inverted before it is output.

Multiplier ML3 multiplies output signal sin (2ωt–θ) from memory table ROM by current peak value command IAm* to obtain current command IA*. That is, $$IA^* = IAm^* \cdot \sin(2\omega t - \theta)$$

Also, multiplier ML4 multiplies output signal cos (2ωt–θ) from memory table ROM by compensation current peak value command –IFm* to obtain compensation current command IF*. That is, $$IF^* = -IFm^* \cdot \cos(2\omega t - \theta)$$

Adder AD2 adds compensation current command IF* and current command IA* to create a new compensation current command IF'*.

Current detector CTF detects compensation current IF that is output from DC active filter DC-AF. Comparator C1 compares compensation current IF with new compensation current command IF'* mentioned above to find a deviation εF=IF'*–IF. This deviation εF is then inverted and amplified (–kF times) by current control compensation circuit GF(S), to obtain voltage command eF* of DC active filter DC-AF, which is input to PWM control circuit PWMC3.

First of all, the operation of DC active filter DC-AF will be described assuming VA*=VA, i.e. IA*=0. The description will be given assuming that compensation current IF is controlled such that IF=IF'*.

When PWM converter CNV is under power running (Ism= Ism*>0), compensation current IF of DC active filter DC-AF is controlled such that:

$$\begin{aligned} IF &= IF'^* = IF^* \\ &= -IFm^* \cdot \cos(2\omega t - \theta) \\ &= -Ism \cdot VCm/(2 \cdot Vd) \cdot \cos(2\omega t - \theta) \end{aligned}$$

Thus, as compensation current IF, a current flows that is the same as fluctuation current idc of the DC side of PWM converter CNV. As a result, fluctuation current idc cannot flow into main smoothing capacitor Cd, and fluctuation of DC voltage Vd is eliminated. When the magnitude of input current Ism changes, compensation current IF also changes in response to this change. As a result, fluctuation current idc always coincides with compensation current IF so that fluctuation of DC voltage Vd can be eliminated.

Likewise, when PWM converter CNV is in regenerative operation (Ism=Ism*<0), the sign of compensation current command IF* is not inverted by sign inverter AS2, and compensation current IF of DC active filter DC-AF is controlled such that:

$$\begin{aligned} IF &= IF^* = IF^* \\ &= IFm' \cdot \cos(2\omega t - \theta) \\ &= Ism \cdot VCm/(2 \cdot Vd) \cdot \cos(2\omega t - \theta) \end{aligned}$$

Since the phase of fluctuation current idc on the DC side of PWM converter CNV is inverted during regenerative operation, it is controlled such that IF=idc. As a result, cancellation is achieved and the fluctuation of applied voltage Vd of main smoothing capacitor Cd is also eliminated.

Next, the process of control of voltage VA that is applied to DC capacitor CA of DC active filter DC-AF will be described. This description will also be given referring to FIG. 9.

When PWM converter CNV is in power running (Ism= Ism*>0), sign inverter AS1 outputs input signal IAm* directly without inversion.

Compensation current IF of DC active filter DC-AF is controlled so as to coincide with new compensation current command IF'*=IF*+IA* described above. Specifically, $$\begin{aligned} IF &= IF'^* = IF^* + IA^* \\ &= -IFm^* \cdot \cos(2\omega t - \theta) + IAm^* \cdot \sin(2\omega t - \theta) \end{aligned}$$

The vector diagram for this case is shown is FIG. 9(b).

When VA*>VA, deviation εA assumes a positive value, which is then multiplied –KA times to give current peak value IAm* of a negative value. Consequently, current vector IA of FIG. 9(b) goes in the opposite direction, and phase angle φF becomes less than 90°, so active power PA which flows into DC active filter DC-AF takes a positive value, and the stored energy of DC capacitor CA increases. As a result, voltage VA of DC capacitor CA increases, and control is achieved such that VA=VA*.

In the opposite process, when VA*<VA, deviation εA assumes a negative value, which is then multiplied by –KA times, to give current peak value IAm* of a positive value. Consequently, current vector IA becomes as shown in FIG. 9(b), so phase angle φF becomes larger than 90°, and active power PA flowing into DC active filter DA-AF assumes a negative value, so that the stored energy of DC capacitor CA is decreased. As a result, voltage VA of DC capacitor CA is decreased, so that control is still achieved to make VA= VA*.

When PWM converter CNV is performing regenerative operation (Ism=Ism*<0), sign inverter AS1 delivers an output obtained by inverting the sign of input signal IAm*. Since, under these conditions, IFm* is not inverted by sign inverter AS2, compensation current IF of active filter DC-AF is given by:

$$\begin{aligned} IF &= IF^* = IF^* + IA^* \\ &= IFm^* \cdot \cos(2\omega t - \theta) - IAm^* \cdot \sin(2\omega t - \theta) \end{aligned}$$

In this case, it may be considered that the all phases of the entire vector diagram of FIG. 9(b) are rotated by 180°, so control is achieved such that VA=VA* just as in the case of power running.

FIG. 11 is a layout diagram showing a sixth embodiment of a DC active filter DC-AF of a power conversion system according to this invention.

Figure 11A:
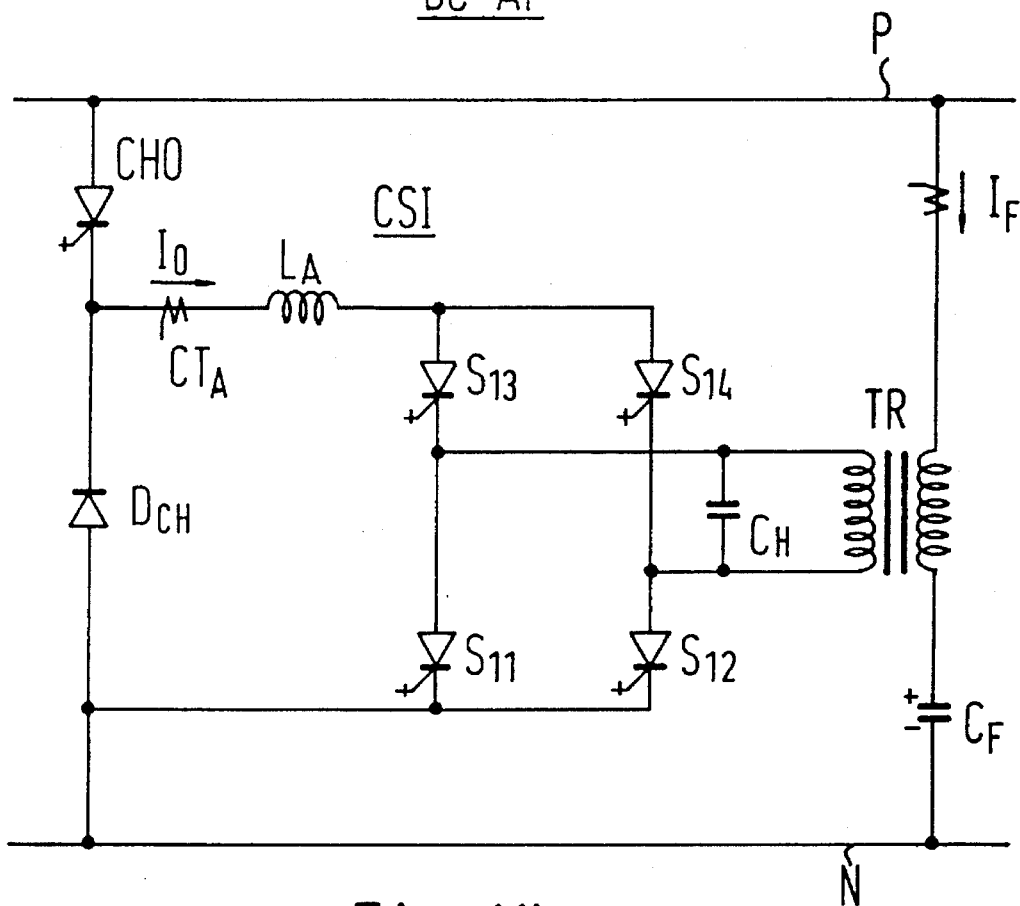
FIGS. 11(a)–(c) are layout diagrams showing a DC active filter of a power conversion system according to a sixth embodiment of this invention.

In FIG. 11(a), P and N are DC positive and negative terminals of the main circuit, CHO is a switching device for a chopper, DCH is freewheeling diode for a chopper, LA is DC inductor, CSI is a single-phase current source PWM inverter, CH is a high frequency capacitor, TR is transformer, and CF is DC smoothing capacitor. Single-phase current source PWM inverter CSI is constituted by switching devices S11 to S14.

Figure 11B:
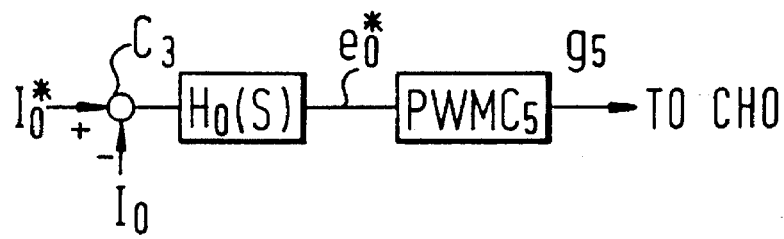
Figure 11C:
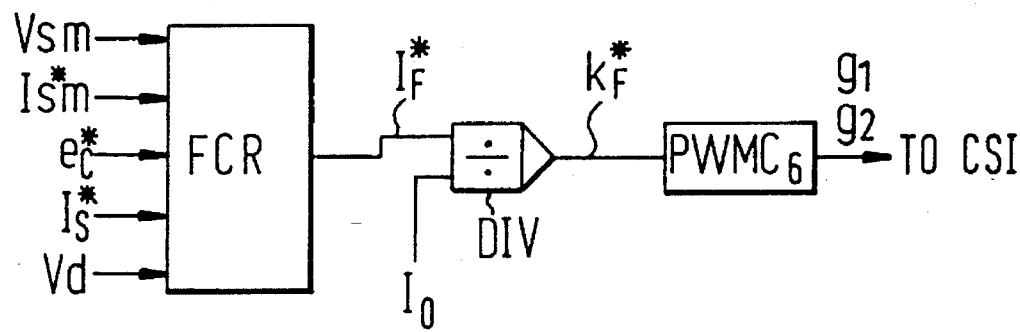

The control device, as shown in FIG. 11(b) and FIG. 11(c) is constituted by current detector CTA, comparator C3, a current control compensation circuit Ho(S), compensation current command circuit FCR, divider DIV, and PWM control circuits PWMCS, PWMC6.

First of all, the action of the DC chopper will be described.

Current detector CTA detects DC current Io flowing through DC inductor LA and inputs this to comparator C3, where it is compared with current command value Io* to obtain a deviation εo=Io*–Io. Deviation so is amplified by current control compensation circuits Ho(S) to create a voltage command value eo*, which is then input to PWM control circuit PWMCS. PWM control circuit PWMC5 applies a gate signal g5 to switching device CHO such as to make the mean value of the voltage that is applied to DC inductor LA proportional to voltage command value eo*. Specifically, when voltage command value eo* is small, the ratio of ON time tON with respect to the switching period T of switching device CHO is small, while, when voltage command value eo* becomes larger, the ratio of ON time tON of switching device CHO is made larger.

When Io*>Io, deviation εo assumes a positive value, and voltage command value eo* is increased, causing the ratio of ON time of switching device CHO to become larger, increasing DC current Io. In the opposite situation, when Io*<Io, deviation εo assumes a negative value, causing decrease of voltage command value eo*, which decreases the ratio of ON time of switching device CHO, decreasing DC current Io. Control is thereby exercised such that DC current Io equals the DC current command value Io*.

Next, the action of DC active filter DC-AF will be described. Compensation current command circuit FCR of FIG. 11 is constructed the same way as the circuit FGR described with reference to FIG. 7. Command value IF* of compensation current IF passed by DC active filter DC-AF is found by calculation from power source voltage peak value Vsm, input current peak value command Ism*, voltage command eC*, input current command Is* of PWM converter CNV, and DC voltage detected value Vd. Compensation current command value IF* is input to divider DIV, where it is divided by DC current detected value Io (or DC current command value Io*) to obtain an input signal kF* for PWM control of current source PWM inverter CSI. PWM control circuit PWMC6 generates gate signals g1, g2 based on signal kF*, which are applied to current source PWM inverter CSI as described below.

Figure 12:
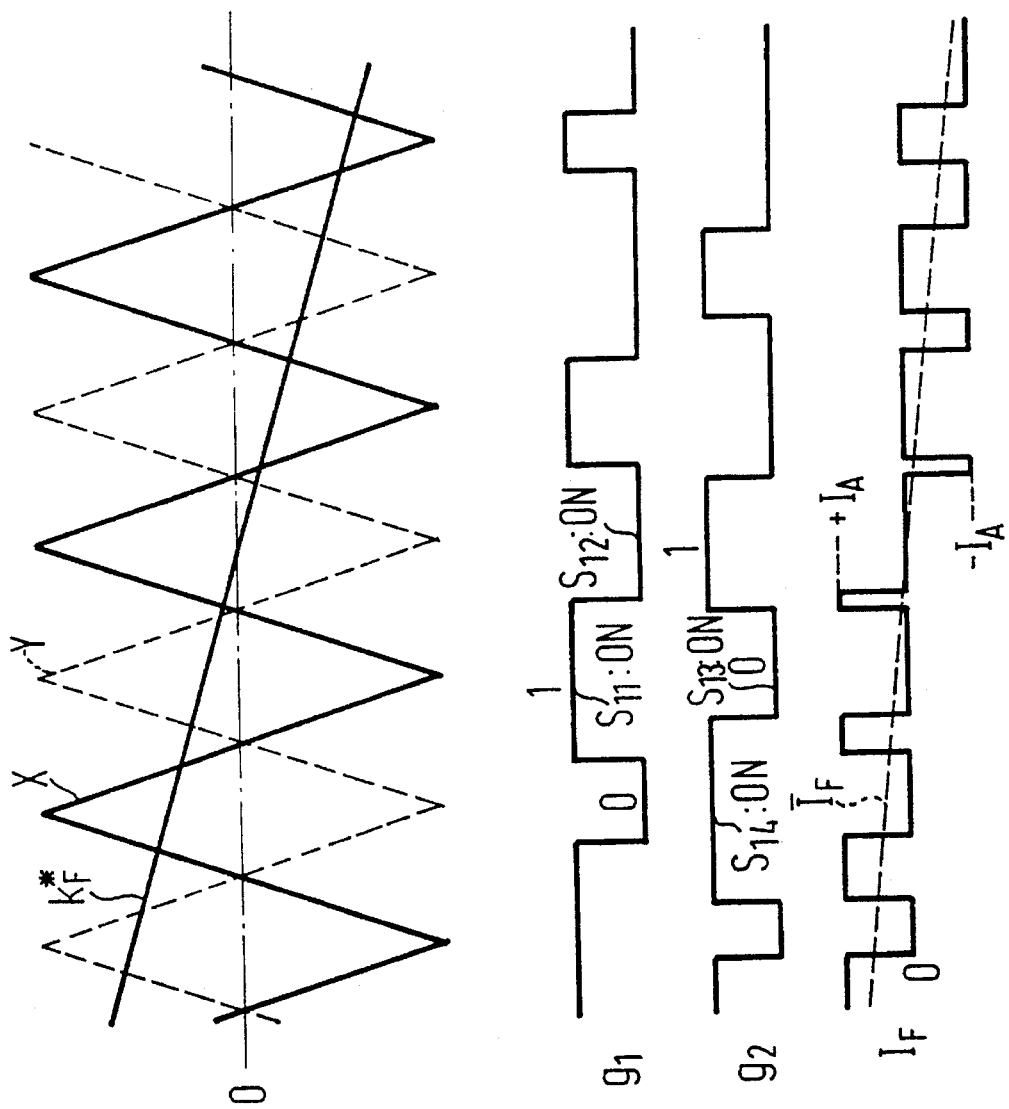
FIG. 12 is a time chart given in explanation of the PWM control action of the DC active filter of FIG. 11.

FIG. 12 is a time chart given in explanation of the PWM control action of current source PWM inverter CSI of FIG. 11. In this Figure, X and Y are carrier signals for PWM control. A triangular wave varying between +1 and −1 is often used as carrier signals X and Y. Triangular wave Y (broken line) is shifted in phase by 180° with respect to triangular wave X (continuous line).

Triangular wave X is compared with percentage modulation kF* to create a gate signal g1 for devices S11 and S12. Triangular wave Y is compared with percentage modulation kF* to create a gate signal g2 for devices S13 and S14. Specifically, when kF*>X, g1=1 and S11 is ON (S12 is OFF)
when kF*≦X, g1=0, and S11 is OFF (S12 is ON)
when kF*>Y, g2=1, and S14 is ON (S13 is OFF)
when kF*≦Y, g2=0, and S14 is OFF (S13 is ON)

In the case of current source inverter CSI, in order to ensure a path for passage of current Io there is provided a lap time, in which ON times of devices S11 and S12 overlap for a short period. A lap time is likewise provided between devices S13 and S14. In FIG. 12, for the sake of simplicity, the lap time is not provided, i.e. the lap time is made zero.

Output current (compensation current) IF of inverter CSI will be as follows, due to the ON/OFF action of devices S11 to S14:

When S11 and S14 are ON, IF=+Io;
When S11 and S13 are ON or S12 and S14 are ON, IF= +Io; and
when S12 and S13 are ON, IF=−Io The waveform of output current IF is shown in the bottom part of FIG. 12. Its mean value IF (VA) is equal to a value kF*·Io, which coincides with aforementioned new compensation current command value IF*. In FIG. 11, a high frequency capacitor CH is provided in order to absorb harmonic components of compensation current IF. Thus, compensation current IF=IF* is supplied from current source PWM inverter CSI.

Since compensation current IF=IF* is equal to fluctuation current idc on the DC side of PWM converter CNV, these two currents cancel each other out. As a result, fluctuation current idc cannot flow into main smoothing capacitor cd shown in FIG. 1, so fluctuation of DC voltage Vd can be eliminated.

With a power conversion system according to this invention employing DC active filter DC-AF of FIG. 11, there is the advantage that compensation current IF can be directly controlled.

Figure 13:
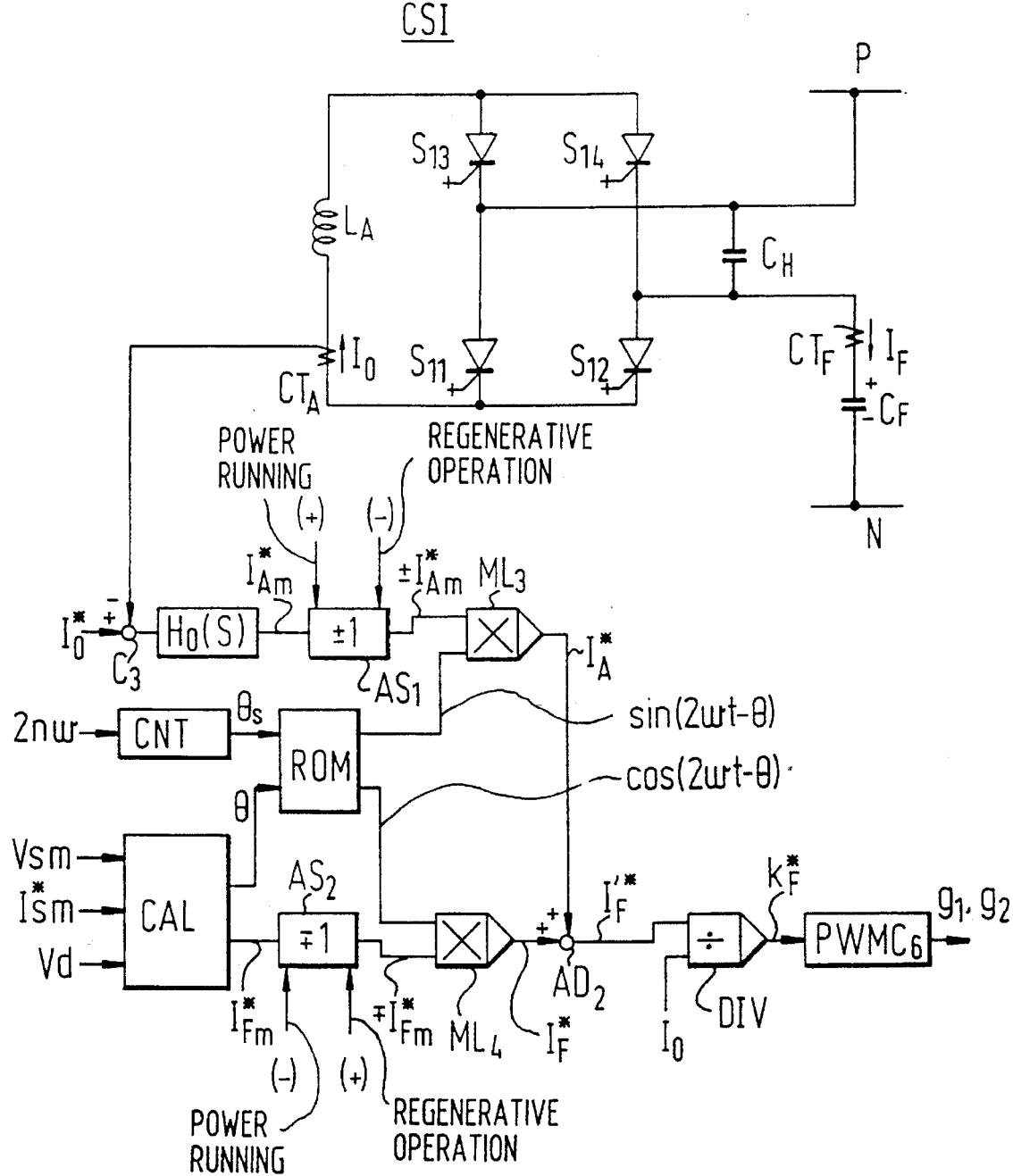
FIG. 13 is a layout diagram showing a DC active filter of a power conversion system according to a seventh embodiment of this invention.

FIG. 13 is a layout diagram showing a seventh embodiment of a DC active filter DC-AF of a power conversion system according to this invention.

In this Figure, P and N are DC positive side terminal and DC negative side terminal of the main circuit. LA is DC inductor, CSI is single-phase current source PWM inverter, CH is high frequency capacitor and CF is DC smoothing capacitor. Single-phase current source PWM inverter CSI is constituted by switching devices S11 to S14.

The control device is constituted by current detectors CTF, CTA, comparator C3, current control compensation circuit Ho(S), sign inverters AS1, AS2, multipliers ML3, ML4, calculating circuit CAL, counter CNT, memory table ROM, adder AD2, divider DIV, and PWM control circuit PWMC6.

First of all, the control device and the method of finding command value IF* for compensation current IF of DC active filter DC-AF described in FIG. 13 is as already described with reference to FIG. 10. A description thereof is therefore omitted.

Next, current detector CTA detects current Io of DC inductor LA and inputs this to comparator C3. Comparator C3 compares current command value Io* and current detection value Io to find a deviation εo=Io*−Io, which is then inverted and amplified (−Ko times) by current control compensation circuit Ho(S), to create current peak value command IAm*. Current peak value command IAm* is input to multiplier ML3 through sign inverter AS1.

The following control device and the method of finding current command IA* is the same as already described with reference to FIG. 10. A description thereof is therefore omitted.

Adder AD2 adds compensation current command IF* and current command IA* to create new compensation current command IF'*. This compensation current command IF'* is divided by DC current detection value Io in divider DIV, so as to obtain percentage modulation kF*=IF*'/Io, which is input to PWM control circuit PWMC6.

The PWM control operation of current source PWM inverter CSI has already been described with reference to FIG. 11, and so will be omitted. The mean value IF (av) of output current of current source PWM inverter CSI is equal to kF*·Io, which coincides with new compensation current command value IF'*. In FIG. 13, high frequency capacitor CH is provided in order to absorb the harmonic components of compensation current IF. In this way, compensation current IF=IF'* is supplied from current source PWM inverter CSI.

First of all, the operation of DC active filter DC-AF will be described, taking Io=Io* i.e. IA*=0.

When PWM converter CNV is under power running (Ism= Ism *>0), compensation element IF of DC active filter DC-AF is controlled such that:

$$IF = IF^* = IF^*$$
$$= -IFm^* \cdot \cos(2\omega t - \theta)$$
$$= -Ism \cdot VCm/(2 \cdot Vd) \cdot \cos(2\omega t - \theta)$$

Thus, as compensation current IF, a current which is the same as fluctuation current idc on the DC side of the PWM converter CNV is passed. As a result, fluctuation current idc cannot enter main smoothing capacitor Cd of FIG. 1, and fluctuation of DC voltage Vd is eliminated. When the magnitude of input current Ism of PWM converter CNV is changed, there is a corresponding change in compensation current IF, so that compensation current IF and fluctuation current idc are always the same, so that fluctuation of DC voltage Vd can be eliminated.

Likewise, when PWM converter CNV is under regenerative operation (Ism=Ism*<0), sign inverter AS2 does not invert the sign of compensation current command IF*, so that the compensation current IF of DC active filter DC-AF is controlled to:

$$\begin{aligned} IF &= IF^* = IF^* \\ &= IFm^* \cdot \cos(2\omega t - \theta) \\ &= Ism \cdot VCm/(2 \cdot Vd) \cdot \cos(2\omega t - \theta) \end{aligned}$$

During regenerative operation, the phase of fluctuation current idc of the DC side of PWM converter CNV is inverted, so IF=idc and cancellation is still achieved. Thus, the fluctuation of voltage Vd applied to main smoothing capacitor Cd is also eliminated.

Next, the operation of controlling current Io flowing in DC inductor LA of DC active filter DC-AF will be described with reference to FIG. 9.

When PWM converter CNV is in power running (Ism=Ism*>0), sign inverter AS1 outputs input signal IAm* directly without inversion.

Compensation current IF of DC active filter DC-AF is controlled such that, as described above, it coincides with new compensation current command IF*, that is, $$\begin{aligned} IF &= IF^* = IF^* + IA^* \\ &= -IFm^* \cdot \cos(2\omega t - \theta) + IAm^* \cdot \sin(2\omega t - \theta) \end{aligned}$$

The vector diagram is then as shown in FIG. 9(b).

When Io*>Io, deviation to has a positive value, which is then multiplied by –Ko, to obtain current peak value IAm* that has a negative value. Consequently, the current vector IA of FIG. 9(b) goes in the opposite direction, and phase angle φF becomes smaller than 90°, so that active power PA flowing into DC active filter DC-AF assumes a positive value, and the stored energy of DC inductor LA is increased. As a result, current Io of DC inductor LA is increased, so that control is achieved such that Io=Io*.

In the opposite situation, when Io*<Io, deviation εo assumes a negative value, which is then multiplied by –Ko, to give current peak value IAm* with a positive value. Consequently, current vector IA is as shown in FIG. 9(b), and phase angle φF becomes >90°, so active power PA flowing into DC active filter DC-AF assumes a negative value, causing the stored energy of DC inductor LA to decrease. As a result, current Io of DC inductor LA decreases and control is still effected such that Io=Io*.

When PWM converter CNV is under regenerative operation (Ism=Ism*<0), sign inverter AS1 outputs input signal IAm* with inverted sign. Under these conditions, IFm* is not inverted by sign inverter AS2, so compensation current IF of DC active filter DC-AF becomes:

$$\begin{aligned} IF &= IF^* = IF^* + IA^* \\ &= -IFm^* \cdot \cos(2\omega t - \theta) + IAm^* \cdot \sin(2\omega t - \theta) \end{aligned}$$

In this case, it may be considered that all phases of the entire vector diagram of FIG. 9(b) are rotated by 180°, so control is effected such that Io=Io*, just as it is in power running.

DC active filter of FIG. 13 has the advantage that the chopper device used in FIG. 11 can be eliminated.

Figure 14:
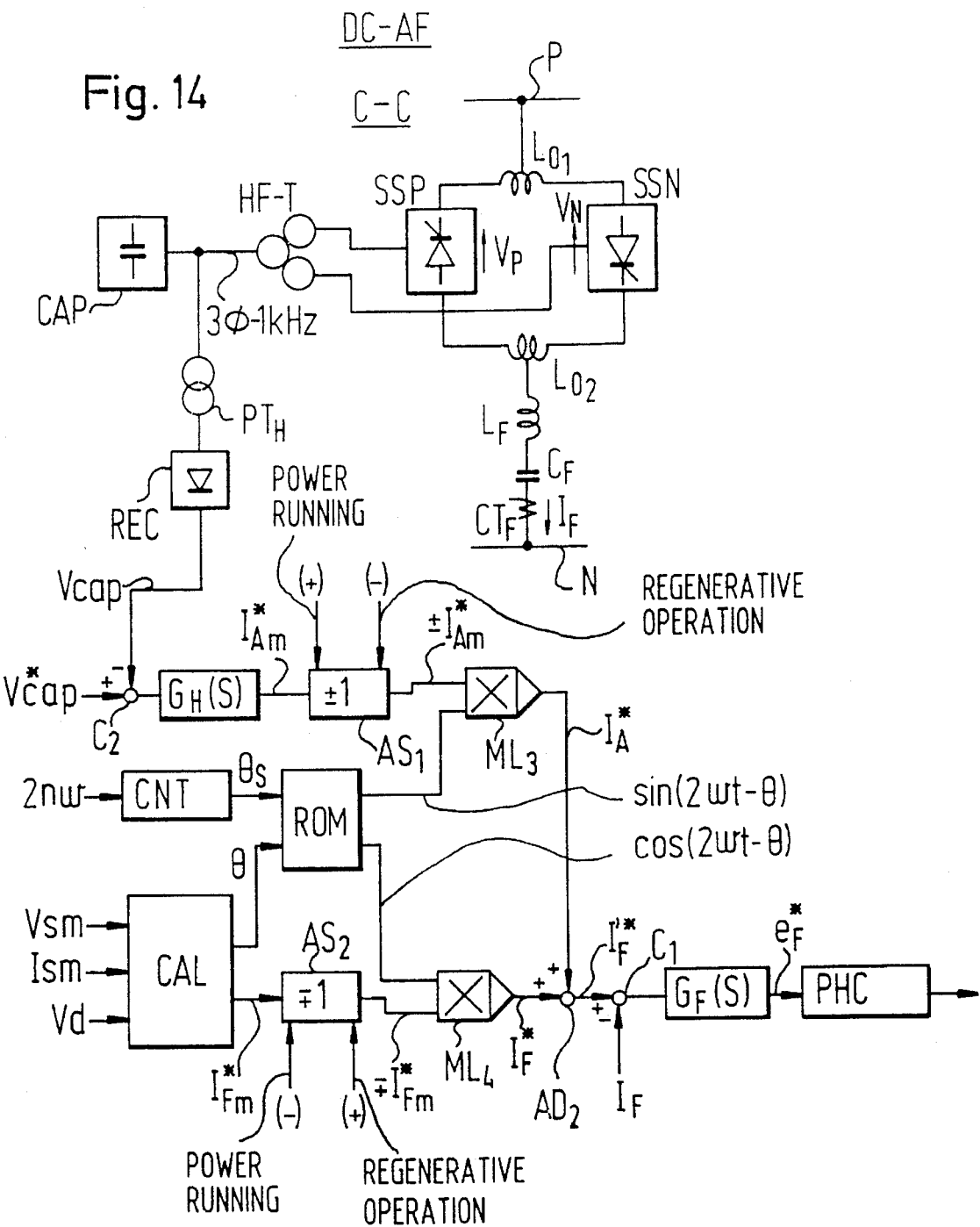
FIG. 14 is a layout diagram showing a DC active filter of a power conversion system according to an eighth embodiment of this invention.

FIG. 14 is a layout diagram showing an eighth embodiment of a DC active filter DC-AF of a power conversion system according to this invention.

In the Figure, CAP indicates a high frequency capacitor, HF-T indicates a high frequency transformer, C/C indicates a single-phase circulating current type cycloconverter, LF indicates inductor, and CF indicates DC smoothing capacitor.

The control device is constituted of: a high frequency voltage detector PTH, a rectifier circuit REC, a current detector CTF, comparators C1, C2 a voltage control compensation circuit GH(S), sign inverters AS1, AS2, multipliers ML3, ML4, calculating circuit CAL, counter CNT, memory table ROM, adder AD2, current control compensation circuit GF(S), and a phase control circuit PHC.

Single-phase circulating current type cycloconverter C/C is constituted of: a positive group converter SSP, a negative group converter SSN, and DC inductors LO1, LO2. Positive group and negative group converters SSP and SSN are externally commutated converters each with six Graetz-connected thyristors. Output voltages VP and VN are controlled by controlling the firing phase angles of these thyristors.

High frequency capacitor CAP is a phase-advance capacitor connected in three-phase Δ connection or Y connection, and constitutes a reactive power source of cycloconverter C/C.

DC inductors LO1, LO2 have the role of suppressing the circulating current ripple of cycloconverter C/C, and are indispensable in circulating current type cycloconverter C/C wherein positive group and negative group converters SSP, SSN are simultaneously actuated. High frequency transformer HF-T has the role of electrically insulating positive group converter SSP and negative group converter SSN so as to reduce the circulating current ripple, and is provided in order to decrease the capacity of DC inductors LO1, LO2.

If firing phase angles (lag) of positive group and negative group converters SSP, SSN are respectively, αP, αN, circulating current type cycloconverter C/C controls phase angles αP, αN, such that αN=180°–αP. As a result, if the directions of the arrows are taken as being positive for output voltages VP, VN of the positive group and negative group converters SSP, SSN in FIG. 14, $$VP = k \cdot VCAP \cdot \cos \alpha P$$

$$VN = -k \cdot VCAP \cdot \cos \alpha N = VP$$

The difference voltage (VP–VN) of positive group converter SSP and negative group converter SSN is applied to DC inductors LO1, LO2. As output voltage VF of cycloconverter C/C, an average value (VP+VN)/2 of output voltages VP and VN of the positive group and negative group converters SSP, SSN is generated. Output voltage VF=(VP+ VN)/2 is a voltage proportional to the input of phase control circuit PHC of FIG. 14 i.e. the voltage command value eF*.

Cycloconverter C/C directly converts the three-phase high frequency voltage applied to high frequency capacitor CAP to a single-phase variable voltage. Cycloconverter C/C always takes a lag current, as it executes natural commutation using this high frequency voltage. Consequently, seen from the high frequency power source, cycloconverter C/C can be considered as a kind of inductor LC that takes a lagging reactive power QCC. When the circulating current of cycloconverter C/C is increased, lag reactive power QCC is increased, and the equivalent inductance LCC of inductor LC is decreased. In the opposite situation, when the circulating current is decreased, the equivalent inductance LCC of inductor LS is increased.

A high frequency power source is established by high frequency capacitor CAP that takes leading reactive power and cycloconverter C/C that takes lagging reactive power. Specifically, if a capacitance of high frequency capacitor CAP is taken as CCAP, and the equivalent inductance of cycloconverter C/C is taken as LCC, a resonance circuit is constituted having a resonant frequency:

$$fCAP=1/\{2\cdot\pi(LCC\cdot CCAP)^{1/2}\}$$

Since capacitance CCAP of high frequency capacitor CAP is constant, resonant frequency fCAP of this high frequency power source can be adjusted by adjusting the circulating current of cycloconverter C/C.

In fact, a circulating current flow such that the resonance frequency fCAP coincides with the frequency of the three-phase reference voltage employed in phase control circuit PHC of the cycloconverter C/C, thereby a high frequency power source is automatically established. Its principle of operation has already been described in detail in Japanese Patent Disclosure No. Sho.63-23591, and a description thereof will therefore be omitted.

The control device and the method of finding command value IF* for compensation current IF of DC active filter DC-AF described in FIG. 14 is as already described with reference to FIG. 10. A description thereof is therefore omitted.

Next, the method of control of peak value VCAP of the three-phase voltage applied to high frequency capacitor CAP of FIG. 14 will be described.

First of all, the voltage applied to high frequency capacitor CAP is detected by high frequency voltage detector PTH, and is then rectified by rectifier circuit REC to find a peak value VCAP thereof.

Next, voltage detection value VCAP and a voltage command value VCAP* are compared by comparator C2 to find a deviation εCAP=VCAP*−VCAP. Deviation εCAP is inverted and amplified (−KH times) by voltage control compensation circuit GH(S). Output signal IAm* of voltage control compensation circuit GH(S) is input through sign inverter AS1 to multiplier ML3, where it is multiplied with a unit sine wave sin (2ωt−θ) to obtain command value IA* for current vector IA shown in FIG. 9. When PWM converter CNV of main circuit is performing regenerative operation, sign inverter AS1 inverts the sign of this current peak value IAm*.

Adder AD2 adds compensation current command value IF* and current command value IA*, to obtain a new compensation current command value IF'*=IF*+IA*. Current detector CTF detects compensation current IF that is output from DC active filter DC-AF. Comparator C1 compares detected compensation current IF with new compensation current command value IF'* to find a deviation εF=IF'*−IF.

Current control compensation circuit GF(S) inverts and amplifies (−kF times) deviation εF=IF'*−IF, and the result is input to phase control circuit PHC as voltage command value eF* of cycloconverter C/C. Cycloconverter C/C generates a voltage VF proportional to current command value eF* as described above. Specifically, it generates:

$$VF=(VP+VN)/2.$$

When IF'*>IF, deviation εF assumes a positive value, and voltage command value eF* assumes a negative value. Consequently, output voltage VF of cycloconverter C/C also takes a negative value, reducing compensation current IF.

In the opposite situation, when IF*<IF, deviation εF assumes a negative value, and voltage command value eF* takes a positive value. Consequently, output voltage VF of cycloconverter C/C also takes a positive value, and compensation current IF is increased. In this way, compensation current IF is controlled so as to be equal to command value IF'* inductor Hereinbelow, the description will be continued, taking IF=IF'*.

when VCAP*>VCAP, deviation εCAP assumes a positive value, and current peak value IAm* assumes a negative value. As a result, current vector IA of FIG. 9(b) is inverted in phase by 180°, and phase angle φF between a compensation current IF' and a voltage VF' generated by DC active filter DC-AF becomes smaller than 90°. As a result, active power is fed to high frequency capacitor CAP through cycloconverter C/C, the stored energy of high frequency capacitor CAP is increased, and peak value VCAP of the applied voltage is increased.

In the opposite situation, when VCAP*<VCAP, deviation εCAP assumes a negative value, and current peak value IAm* assumes a positive value. As a result, current vector IA is increased in the direction shown in FIG. 9(b), and the phase angle φF of compensation current IF' and voltage VF' generated by DC active filter DC-AF becomes larger than 90°. As a result, active power is discharged from high frequency capacitor CAP through cycloconverter C/C, decreasing the stored energy of high frequency capacitor CAP and decreasing peak value VCAP of the applied voltage.

In this way, control is exercised such that applied voltage VCAP of high frequency capacitor CAP is equal to its command value VCAP*.

With the eighth embodiment of FIG. 14, DC active filter DC-AF can be constructed using thyristors employing natural commutation, so a power conversion system of high efficiency and economy can be provided.

Hereinabove, embodiments of this invention were mainly described in which power source voltage Vs and input current Is were in the same phase (when operating under power running) or in opposite phase (during regenerative operation).

Figure 15:
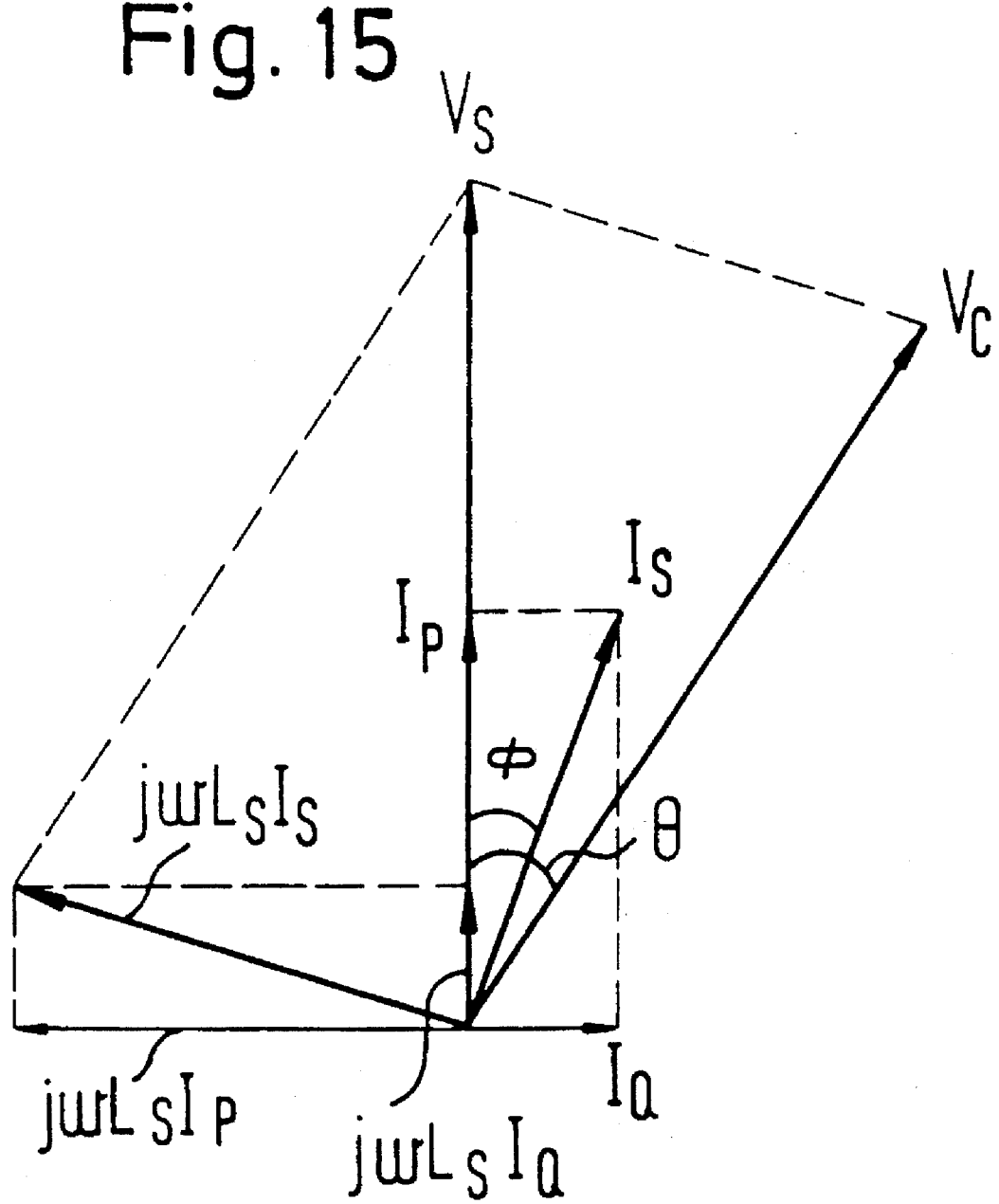
FIG. 15 is a voltage/current vector diagram given in explanation of the operation of the power conversion system of this invention.

FIG. 15 is a voltage/current vector diagram of the AC side of a PWM converter CNV of a power conversion system of this invention. This shows an example of a vector diagram when operating with input current Is lagging by a phase angle φ from power source voltage Vs, under power running.

In this Figure, Vs is power source voltage, Is is input current, VC is AC side generated voltage of the PWM converter, IP is active current component of input current Is, IQ is reactive current component of input current Is, ω is angular frequency of single-phase AC power source SUP, and LS is inductance of the AC inductor.

Active current IP and reactive current IQ can be expressed by the following expressions in terms of phase angle φ. Specifically:

$$IP=Is\cdot\cos\phi$$

$$IQ=Is\cdot\sin\phi$$

Figure 16:
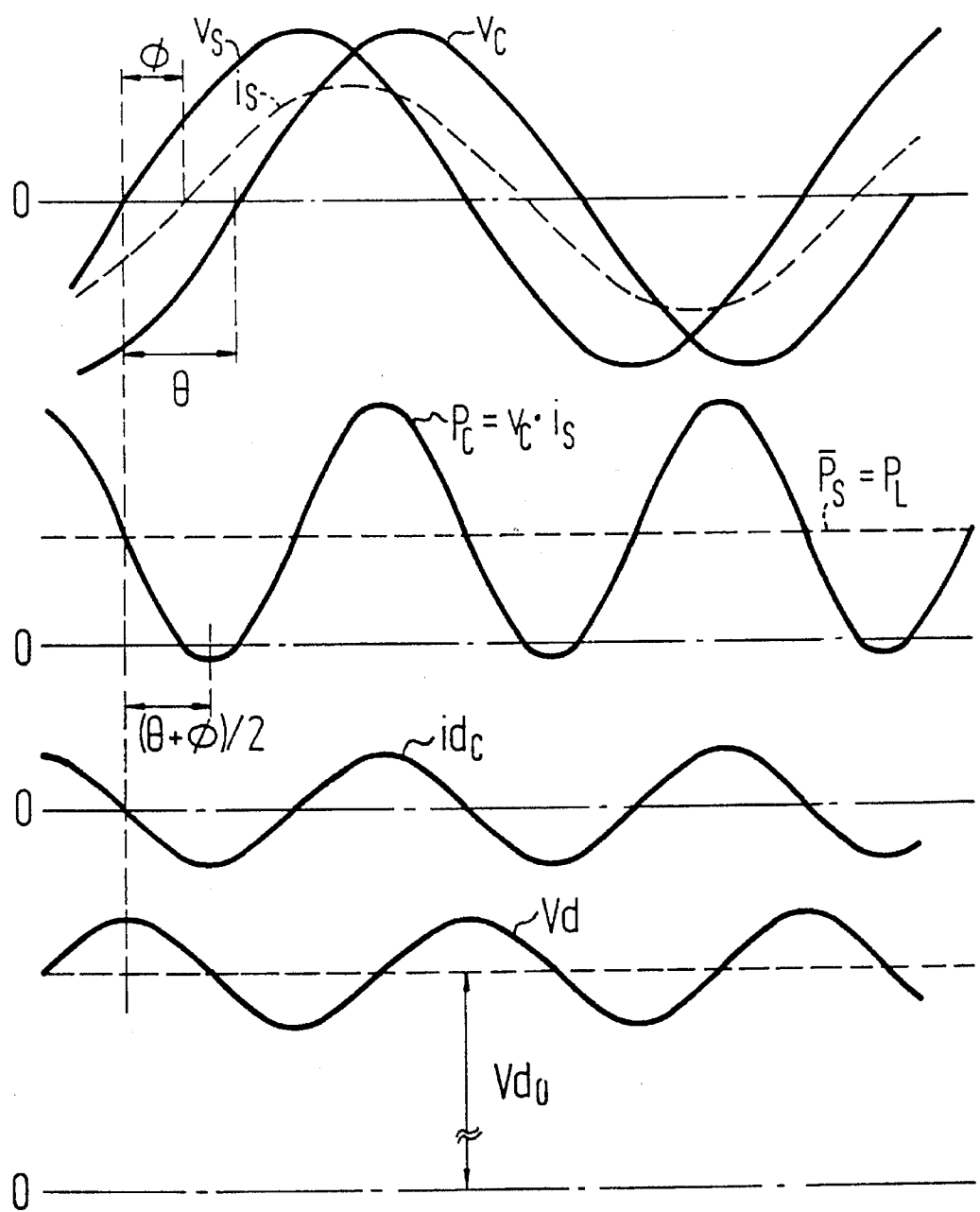
FIG. 16 is a view showing voltage, current and power waveforms of the various units given in explanation of the operation of the power conversion system of this invention.

The passage of input current Is creates voltage jω·LS·Is at two terminals of AC inductor LS, so voltage Vc generated by converter CNV is as shown in the FIG. 15. FIG. 16 shows the waveforms of the voltage, current and power of the various units under these conditions.

If we take:

$$vS=Vsm\cdot\sin(\omega t)$$

$$iS = Ism \cdot \sin(\omega t - \phi)$$

and $$vc = VCm \cdot \sin(\omega t - \theta),$$

then:

$$Ism = (IPm^2 + IQm^2)^{1/2}$$

$$\phi = \tan^{-1}(IQ/IP)$$

$$VCm = (VCP^2 + VCQ^2)^{1/2}$$

$$\theta = \tan^{-1}(VCQ/VCP)$$

where $$VCP = Vsm - \omega \cdot LS \cdot IQm$$

and $$VCQ = -\omega \cdot LS \cdot IPm$$

Also, instantaneous power PC on the AC side of PWM converter CNV is:

$$\begin{aligned} PC &= vc \cdot is \\ &= VCm \cdot \sin(\omega t - \theta) \cdot Ism \cdot \sin(\omega t - \phi) \\ &= (VCm \cdot Ism/2) \cdot \{\cos(\theta - \phi) - \cos(2\omega t - \theta - \phi)\}. \end{aligned}$$

The first term of the above expression is the mean value of the active power and is equal to power PL consumed by the load device. Consequently, the amount of power fluctuation $\Delta PC$ is:

$$\Delta PC = (-VCm \cdot Ism/2) \cdot \cos(2\omega t - \theta - \phi)$$

Dividing this power fluctuation amount $\Delta PC$ by DC voltage Vd gives fluctuation amount idc of the DC current. This can be expressed as:

$$idc = (-VCm \cdot Ism/2Vd) \cdot \cos(2\omega t - \theta - \phi) \quad (A)$$

If no DC active filter DC-AF is present, the fluctuation amount $\Delta Vd$ of DC voltage Vd is:

$$\begin{aligned} \Delta Vd &= (1/Cd)\int idc\, dt \\ &= \{-VCm \cdot Ism/(2\omega \cdot Cd \cdot Vd)\} \cdot \sin(2\omega t - \theta - \phi). \end{aligned}$$

In other words, the fluctuation $\Delta Vd$ of DC voltage Vd can be made zero if DC active filter DC-AF takes compensation current IF=idc.

In case that PWM converter CNV is operated with an input power factor of 1, DC active filter DC-AF is controlled such that compensation current IF is made equal to fluctuation amount idc of DC current in the following expression (B).

In the above-described expression (A)

$$idc = (-VCm - Ism/2Vd) \cdot \cos(2\omega t - \theta - \phi) \quad (A)$$

by inserting phase angle $\phi = 0$, expression (B) is obtained.

$$idc = (-VCm \cdot Ism/2Vd) \cdot \cos(2\omega t - \phi) \quad (B)$$

In this case, the fluctuation $\Delta Vd$ of DC voltage Vd can be made zero if DC active filter DC-AF takes compensation current IF=idc of expression (B)

Figure 17:
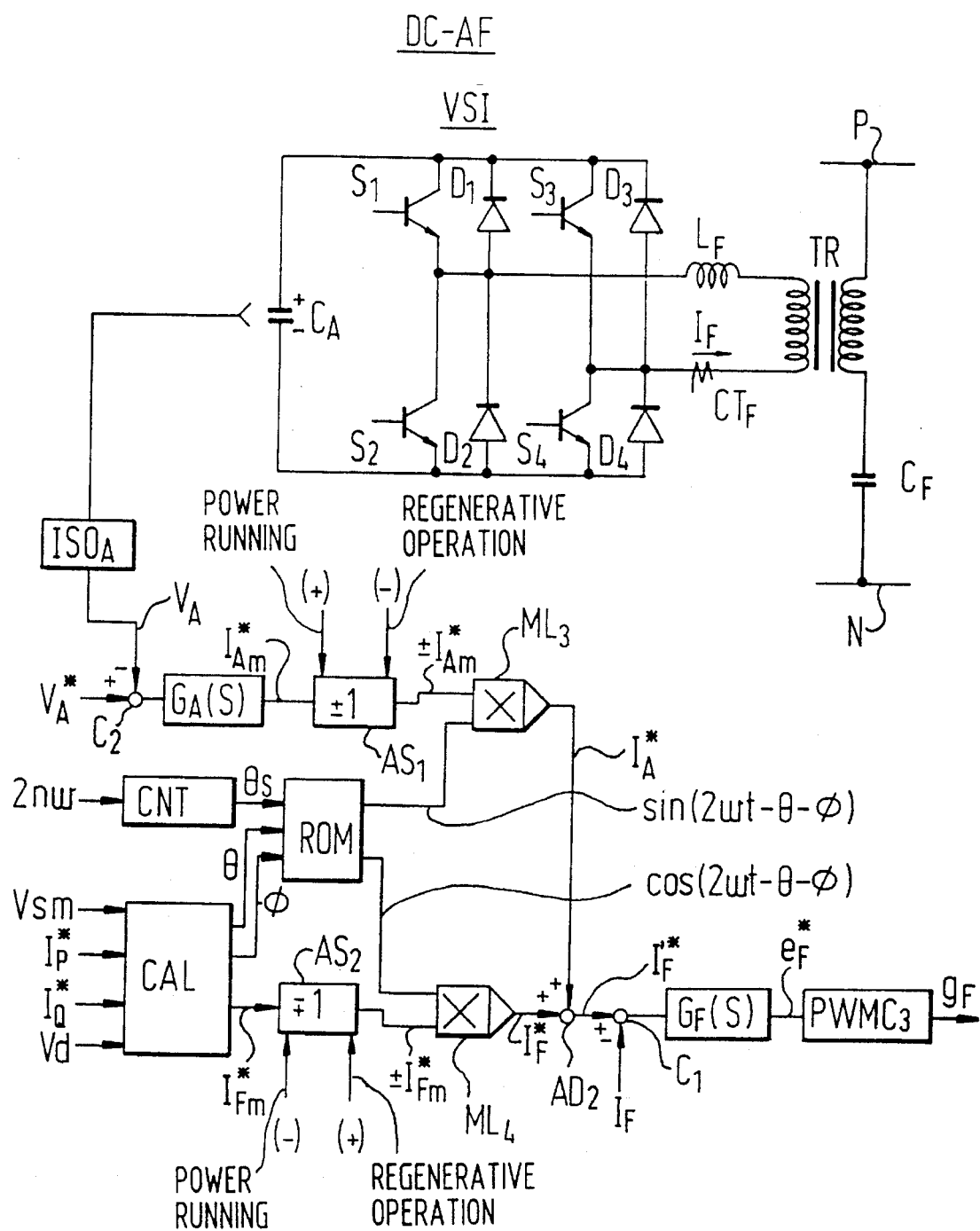
FIG. 17 is a layout diagram showing a DC active filter of a power conversion system according to a ninth embodiment of this invention.

FIG. 17 is a layout diagram showing a ninth embodiment of a DC active filter DC-AF of a power conversion system according to this invention when the input power factor cos $\phi$ is not 1. In this Figure, the main circuit of DC active filter DC-AF is the same as that shown in FIG. 10.

The control device of DC active filter DC-AF is the same as that shown in FIG. 10, except calculating circuit CAL and memory table ROM.

First of all, calculating circuit CAL inputs detected value Vsm of voltage peak value of single-phase power source SUP, the active component IPm* and reactive component IQm* of input current peak value command Ism*, and DC voltage detected value Vd, and calculates phase angle $\theta$ power factor angle $\phi$, as shown in FIG. 15, and compensation current peak value command IFm* using the following expressions:

$$Ism^* = (IPm^{*2} + IQm^{*2})^{1/2}$$

$$\phi = \tan^{-1}(IQm^*/IPm^*)$$

$$VCp = Vsm - \omega \cdot Ls \cdot IQm^*$$

$$VCQ = -\omega \cdot Ls \cdot IPm^*$$

$$VCm = (VCP^2 + VCQ^2)^{1/2}$$

$$\theta = \tan^{-1}(VCQ/VCP)$$

$$IFm^* = Ism^* \cdot VCm/(2 \cdot Vd)$$

Compensation current peak value command IFm* is input to multiplier ML4 through sign inverter AS2. When PWM converter CNV is operating under power running (Ipm*>0), sign inverter AS2 inverts the sign of input signal IFm* before outputting it. When PWM converter CNV is performing regenerative operation (Ipm*<0), sign inverter AS2 outputs input signal IFm* directly without inversion.

Calculating circuit CAL outputs phase angle $\theta$ and power factor angle $\phi$ thus calculated to memory table ROM.

Meanwhile, counter CNT is actuated with clock frequency of 2n times power source angular frequency $\omega$ and outputs its count value $\theta s = 2\omega t$ to memory table ROM. Memory table ROM calculates a phase angle ($\theta s - \theta - \phi$), as a phase address. Memory table ROM stores sine wave values and cosine wave values at phase addresses, and outputs a unit sine wave $\sin(2\omega t - \theta - \phi)$ and a unit cosine wave $\cos(2\omega t - \theta - \phi)$ corresponding to phase angle ($\theta s - \theta - \phi$).

Also, DC detector ISOA detects voltage VA of DC capacitor CA and inputs this to comparator C2. Comparator C2 compares voltage command value VA* and voltage detection value VA to find a deviation $\epsilon A = VA^* - VA$, which is then inverted and amplified (–KA times) by voltage control compensation circuit GA(S) to create current peak value command IAm*. Current peak value command IAm* is input to multiplier ML3 through sign inverter AS1. When PWM converter CNV is under power running (when Ipm*>0), sign inverter AS1 outputs input signal IAm* directly without inversion. When PWM converter CNV is under regenerative operation (Ipm*<0), sign inverter AS1 outputs input signal IAm* with its sign inverted.

Multiplier ML3 multiplies output signal $\sin(2\omega t - \theta - \phi)$ from memory table ROM and current peak value command IAm*, and outputs the following current command IA*. That is, $$IA^* = IAm^* \cdot \sin(2\omega t - \theta - \phi)$$

Also, multiplier ML4 multiplies output signal $\cos(2\omega t - \theta - \phi)$ from memory table ROM by compensation current peak value command –IFm*, and outputs the following compensation current command IF*. That is, $$IF^* = -IFm^* \cdot \cos(2\omega t - \theta - \phi).$$

Adder AD2 adds compensation current command IF* and current command IA* to create new compensation current command IF'*.

Current detector CTF detects compensation current IF that is output from DC active filter DC-AF. Comparator C1 compares compensation current IF with new compensation current command IF'*, and finds a deviation $\epsilon F=IF'^*-IF$. Deviation $\epsilon F$ is inverted and amplified ($-KF$ times) by current control compensation circuit GF(S) to obtain a voltage command eF* of DC active filter DC-AF, which is input to PWM control circuit PWMC3.

First of all, the operation of DC active filter DC-AF will be described assuming VA*=VA, in other words IA*=0. The description will also assume that compensation current IF is controlled such that IF=IF'*.

When PWM converter CNV is under power running (Ipm*> 0), compensation current IF of DC active filter DC-AF is controlled to:

$$\begin{aligned} IF &= IF^* = IF^* \\ &= -IFm^* \cdot \cos(2\omega t - \theta - \phi) \\ &= -Ism \cdot VCm/(2 \cdot Vd) \cdot \cos(2\omega t - \theta - \phi) \end{aligned}$$

So, compensation current IF flows the same as the fluctuation current idc on the DC side of PWM converter CNV. As a result, fluctuation current idc cannot flow into main smoothing capacitor Cd, so the fluctuation of DC voltage Vd is eliminated. When the magnitude of input current Ism changes, compensation current IF also changes correspondingly. As a result, compensation current IF and fluctuation current idc are always equal, so that the fluctuation of DC voltage Vd can be eliminated.

Likewise, when PWM converter CNV is performing regenerative operation (Ipm*<0), the sign of compensation current command IF* is not inverted by sign inverter AS2, and compensation current IF of DC active filter DC-AF is controlled to:

$$\begin{aligned} IF &= IF^* = IF^* \\ &= IFm^* \cdot \cos(2\omega t - \theta - \phi) \\ &= Ism \cdot VCm/(2 \cdot Vd) \cdot \cos(2\omega t - \theta - \phi) \end{aligned}$$

Since the phase of fluctuation current idc on the DC side of PWM converter CNV is inverted under regenerative operation, cancellation is likewise obtained with IF=idc, and the fluctuation of applied voltage Vd of main smoothing capacitor Cd is eliminated.

The control operation of voltage VA that is applied to DC capacitor CA of DC active filter DC-AF is the same as that described with reference to FIG. 10. However, the reference axes of the vector diagram shown in FIG. 9(b) may be considered as being changed to:

$-\cos(2\omega t-\theta-\phi),$ $\sin(2\omega t-\theta-\phi)$

As described above, with the power conversion system of this invention, DC voltage Vd can be maintained constant even when the input power factor is not 1. Also, the power fluctuation originating from single-phase power source SUP is absorbed by DC active filter DC-AF incorporating DC smoothing capacitor CF, so only the harmonic current produced by PWM control passes to main smoothing capacitor Cd. Consequently, the capacitance of main smoothing capacitor Cd can be greatly reduced. In other words, with the power conversion system of this invention, a more economical system can be provided, by making the capacitance of main smoothing capacitor Cd smaller than that of DC smoothing capacitor CF of DC active filter DC-AF.

The capacitance of DC active filter DC-AF is determined by the magnitude of compensation current IF=idc flowing in DC smoothing capacitor CF and the magnitude of fluctuation voltage $\Delta Vd$. The magnitude of compensation current IF is determined by power consumption PL of the load device and mean value Vdo (practically constant) of DC voltage Vd, and bears no relationship to the capacitance of DC smoothing capacitor CF.

When operation of the power conversion system is conducted with input power factor $\cos\phi=1$, load PL=3,000 (kW), DC voltage Vd=2,000 (V), power source frequency F= $\omega/2\pi$=50 (Hz), and $\cos\theta$=0.9, peak value IFm of compensation current IF is expressed as: IFm=VCm· Ism/(2·Vdo)=1.666 (A). The peak value $\Delta$VCFm of the fluctuation of the voltage applied to both terminals of DC smoothing capacitor CF due to compensation current IFm is $\Delta$VCFm=IFm/(2$\omega$·CF)=265.2 (V). The capacity (effective value) of single-phase PWM inverter VSI of DC active filter DC-AF is 221 (kVA). This capacity corresponds to 7.4 (%) of load capacity PL=3,000 (kW). Thus, by providing only a small-capacity DC active filter DC-AF, the fluctuation of DC voltage Vd can be eliminated, and a stabilized constant voltage can be supplied to the load device for which DC voltage Vd constitutes a DC power source.

Figure 18:
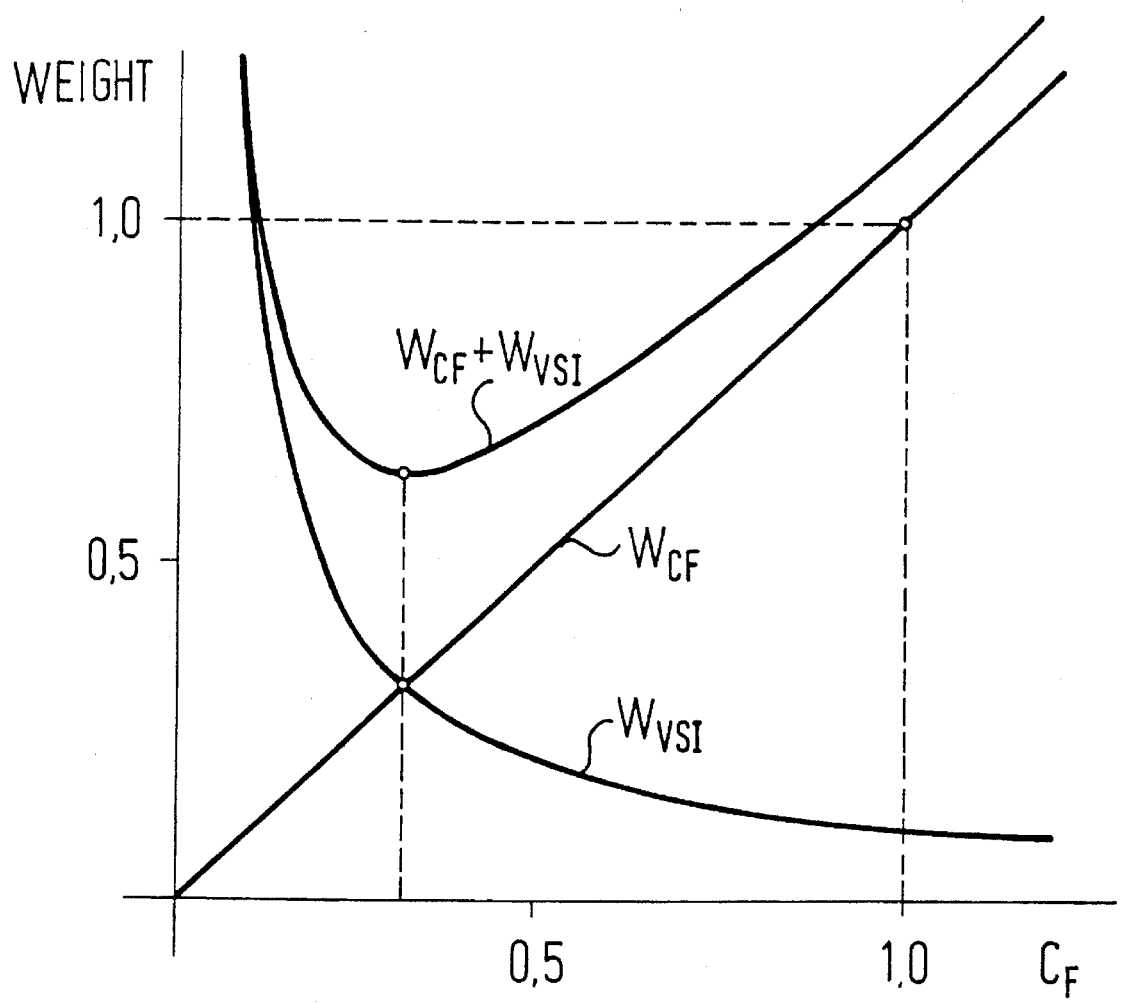
FIG. 18 is a characteristic plot given in explanation of the operation of the power conversion system of this invention.
Figure 19:
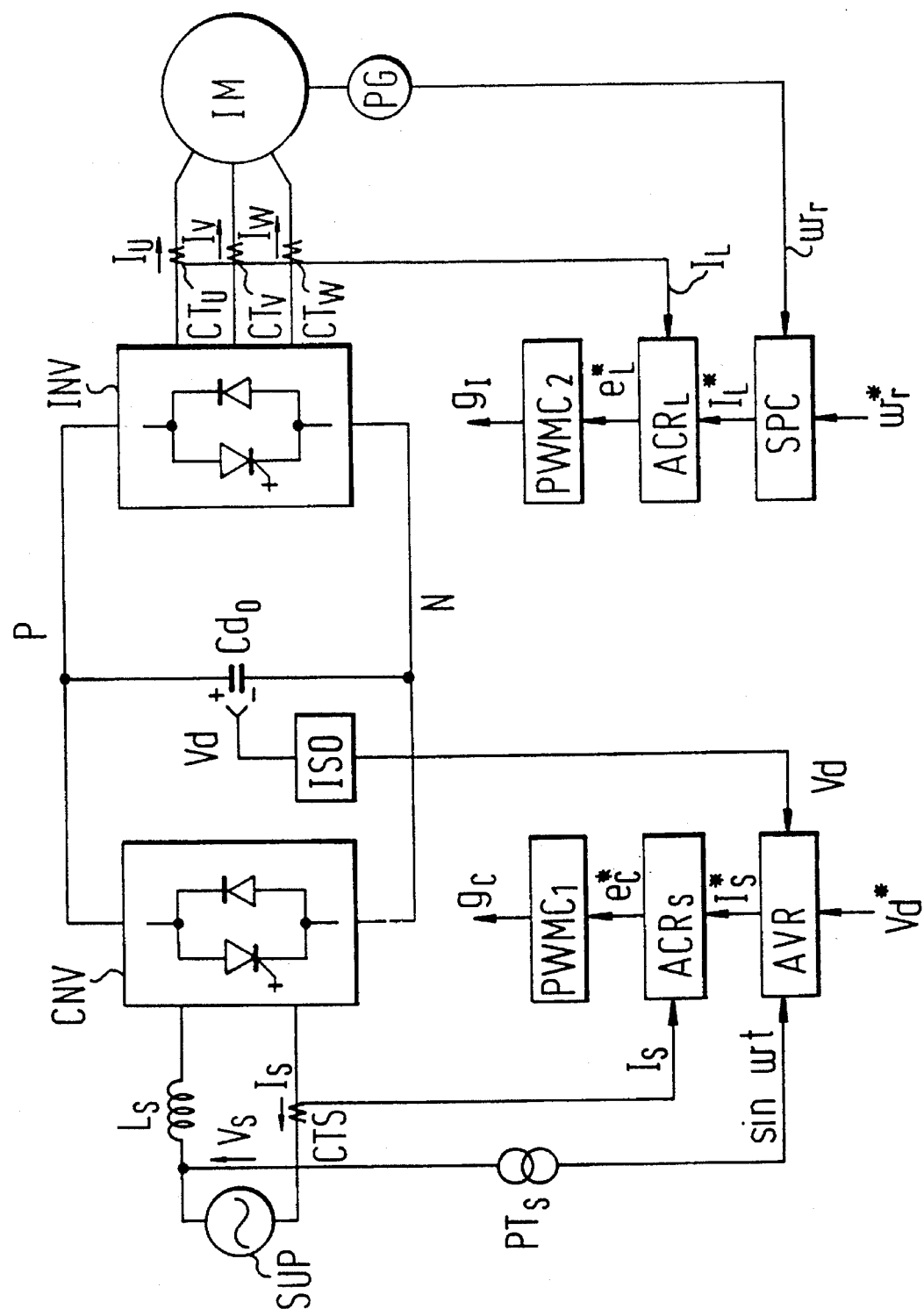
FIG. 19 is a layout diagram showing an example of a prior art power conversion system.

FIG. 18 shows an example of a weight WCF of DC smoothing capacitor CF and a weight WVSI of single-phase PWM inverter VSI in DC active filter DC-AF. These are normalized with respect to the capacitance of DC smoothing capacitor CF. Weight WCF increases in proportion to the increase of the capacitance of DC smoothing capacitor and weight WVSI is in inverse proportion to the capacitance of DC smoothing capacitor CF. For example, in an electric vehicle in which total weight is the most important consideration, the capacitance of DC smoothing capacitor CF may be selected such that weight (WCF+WVSI) is a minimum value.

In the case of the currently running Tokaido Shinkansen railway, in power conversion system (PWM converter+ PWM inverter), for the output capacity of about 3,000 (kW) thereof, a main smoothing capacitor Cd with the capacitance of about 0.02 (F) is provided. Main smoothing capacitor Cd represents a large proportion of the power conversion system as a whole, which is a factor in increased volume and weight of the power conversion system. Also, the fluctuation $\Delta$Vdm of DC voltage of this prior art power conversion system is $\Delta$Vdm=132.6 (V), so that DC voltage Vd varies between 1,867.4 (V) and 2,132.6 (V). As a result, the utilization factor of PWM converter CNV and PWM inverter INV drops to 1,867.4 (V)/2,132.6 (V)=0.876. In other words, PWM converter CNV and PWM inverter INV must be 1/0.876=1.142 times larger.

With the power conversion system of this invention, let us assume that the capacitance of main smoothing capacitor Cd is 0.001 (F) and the capacitance of DC smoothing capacitor CF of DC active filter DC-AF is 0.005 (F). As a result, the peak value $\Delta$VCFm of the fluctuation amount of the voltage applied across both terminals of DC smoothing capacitor CF is $\Delta$VCFm=IFm/(2$\omega$·CF)=512.4 (V), and the capacity (effective value) of single-phase PWM inverter VSI of DC active filter DC-AF is 442 (kVA). This is 14.7 (%) of the output capacity 3,000 (kW) of the power conversion system. In other words, DC active filter DC-AF were to be provided with single-phase PWM inverter VSI having about the same amount of capacity as the amount of increase in capacity of the prior art power conversion system due to the DC voltage fluctuation thereof, the total capacitance of DC smoothing capacitor CF and main smoothing capacitor Cd could be reduced by a factor of 0.3 (=(0.005+0.001)/0.02)=6/20).

The following effects are obtained with the power conversion system according to this invention as described above.

(1) The fluctuation of the DC voltage produced by power fluctuations of the single-phase AC power source can be eliminated, so the utilization factor of the power conversion system can be increased to that extent.

(2) The beat phenomenon of the inverter output current, which created problems with PWM inverter-driven induction motors, is eliminated, so that motor vibration and noise can be greatly reduced.

(3) The capacitance of the DC smoothing capacitor can be greatly reduced and the dimensions and weight of the power conversion system as a whole can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A power conversion system, comprising:

a single-phase AC power source for generating an AC power;

an AC/DC power converter connected to said single-phase AC power source for converting said AC power into a DC power;

a main smoothing capacitor connected to DC terminals of said AC/DC power converter;

a DC active filter connected in parallel with said main smoothing capacitor for controlling a compensation current (IF) flowing in said DC active filter such as to absorb an amount of fluctuation of said AC power supplied from said single-phase AC power source; and a load device connected to said main smoothing capacitor as a DC voltage source for receiving a first DC voltage (Vd) applied to said main smoothing capacitor.

2. The power conversion system according to claim 1, wherein said DC active filter includes:

a DC constant voltage source for generating a second DC voltage;

a voltage source PWM inverter connected to said DC constant voltage source for converting said second DC voltage into a variable-voltage AC voltage;

a single-phase transformer connected to AC side output terminals of said voltage source PWM inverter; and a DC smoothing capacitor connected in series with a secondary winding of said single-phase transformer;

said compensation current (IF) flowing through said DC smoothing capacitor.

3. The power conversion system according to claim 1, wherein said DC active filter includes:

a DC constant voltage source for generating a second DC voltage;

a voltage source PWM inverter connected to said DC constant voltage source for converting said second DC voltage into a variable-voltage AC voltage; and a series circuit of a DC smoothing capacitor and an inductor, said series circuit being connected in series with AC side output terminals of said voltage source PWM inverter;

said compensation current (IF) flowing through said series circuit.

4. The power conversion system according to claim 1, wherein said DC active filter includes:

a DC constant current source for generating a DC current;

a current source PWM inverter connected to said DC constant current source for converting said DC current into a variable-current AC current;

a high frequency capacitor connected to AC output terminals of said current source PWM inverter; and a DC smoothing capacitor connected in series with said high frequency capacitor;

said compensation current (IF) flowing through said DC smoothing capacitor.

5. The power conversion system according to claim 1, wherein said DC active filter includes:

a DC constant current source for generating a DC current;

a current source PWM inverter connected to said DC constant current source for converting said DC current into a variable-current AC current;

a high frequency capacitor connected to AC output terminals of said current source PWM inverter;

a single-phase transformer connected in parallel with said high frequency capacitor; and a DC smoothing capacitor connected in series with a secondary winding of said single-phase transformer;

said compensation current (IF) flowing through said DC smoothing capacitor.

6. The power conversion system according to claim 1, wherein said DC active filter includes:

a high frequency voltage source for supplying a high frequency voltage;

a circulating current type cycloconverter connected to receive said high frequency voltage as an input for generating a single-phase AC voltage; and a DC smoothing capacitor connected in series with output terminals of said circulating current type cycloconverter;

said compensation current (IF) flowing through said DC smoothing capacitor.

7. The power conversion system according to one of claims 2 to 6:

wherein a capacitance of said DC smoothing capacitor of said DC active filter is larger than a capacitance of said main smoothing capacitor.

8. The power conversion system according to claim 1:

wherein said DC active filter controls said compensation current (IF) in response to a difference of a first DC current (Id1) outputted by said AC/DC power converter and a second DC current (Id2) fed into said load device.

9. The power conversion system according to claim 1:

wherein said DC active filter controls said compensation current (IF) in response to a difference of a calculated value (Pc) of an AC instantaneous power of said AC/DC power converter and a calculated value (Pav) of a mean active power supplied from said single-phase AC power source.

10. The power conversion system according to claim 1: wherein said AC/DC power converter includes a PWM converter for controlling an input current (Is) supplied from said single-phase AC power source such that said first DC voltage (Vd) applied to said main smoothing capacitor is practically constant.

11. The power conversion system according to claim 10; wherein a command value (IF*) for said compensation current (IF) of said DC active filter is given as:

$$IF^* = (k1 \cdot ec^* \cdot Is^* - k2 \cdot Vsm \cdot Ism^*)/Vd$$

where a voltage command value of said PWM converter is ec*, an input current command value of said PWM converter is Is*, a peak value of said input current command value (Is*) of said PWM converter is Ism*, a peak value of an output voltage (Vs) of said single-phase AC power source is Vsm, a detection value of said first DC voltage of said main smoothing capacitor is Vd, and proportionality constants are k1 and k2.

12. The power conversion system according to claim 10:

wherein, when said input current (Is) supplied from said single-phase AC power source and an output voltage (Vs) of said single-phase AC power source are controlled to be in-phase sine waves by said PWM converter, a command value (IF*) for said compensation current (IF) of said DC active filter is given as:

$$IF^* = -Ism \cdot Vcm/(2 \cdot Vd) \cdot \cos(2\omega t - \theta) \text{ (during power running), and}$$

$$IF^* = +Ism \cdot Vcm/(2 \cdot Vd) \cdot \cos(2\omega t - \theta) \text{ (during regenerative operation)}$$

where $$VLsm = \omega \cdot Ls \cdot Ism$$

$$Vcm = (Vsm^2 + VLsm^2)^{1/2}$$

$$\theta = \tan^{-1}(VLsm/Vsm)$$

and, where a peak value of said output voltage (Vs) of said single-phase AC power source is Vsm, a peak value of said input current (Is) of said PWM converter is Ism, and a detection value of said first DC voltage of said main smoothing capacitor is Vd.

13. The power conversion system according to claim 10:

wherein, when said input current (Is) supplied from said single-phase AC power source is controlled to be a sine wave with lagging phase angle φ with respect to an output voltage (Vs) of said single-phase AC power source by said PWM converter, a command value (IF*) for said compensation current (IF) of said DC active filter is given as:

$$IF^* = -Ism \cdot Vcm/(2 \cdot Vd) \cdot \cos(2\omega t - \theta - \phi) \text{ (during power running), and}$$

$$IF^* = +Ism \cdot Vcm/(2 \cdot Vd) \cdot \cos(2\omega t - \theta - \phi) \text{ (during regenerative operation)}$$

where $$Ism = (IPm^2 + IQm^2)^{1/2}$$

$$\phi = \tan^{-1}(IQm/IPm)$$

$$VcP = Vsm - \omega \cdot Ls \cdot IQm$$

$$VcQ = -\omega \cdot Ls \cdot IPm$$

$$Vcm = (VcP^2 + VcQ^2)^{1/2}$$

$$\theta = \tan^{-1}(VcQ/VcP)$$

and, where a peak value of said output voltage (Vs) of said single-phase AC power source is Vsm, a peak value of said input current (Is) of said PWM converter is Ism, an active component of said peak value (Ism) is IPm, a reactive component of said peak value (Ism) is IQm and a detection value of said first DC voltage of said main smoothing capacitor is Vd.

14. The power conversion system according to claim 1, wherein said load device includes:

a PWM inverter connected to said main smoothing capacitor for converting said first DC voltage (Vd) into a three-phase AC voltage, and a three-phase induction motor driven by said PWM inverter.

15. A power conversion system, comprising:

a single-phase AC power source for generating an AC power, wherein the frequency of fluctuation of said AC power is twice that of the frequency of said AC power source;

an AC/DC power converter connected to said single-phase AC power source for converting said AC power into a DC power;

a main smoothing capacitor connected to the DC terminals of said AC/DC power converter;

a DC active filter connected in parallel with said main smoothing capacitor for controlling a compensation current (IF) flowing in said DC active filter such as to absorb an amount of fluctuation of said AC power supplied from said single-phase AC power source;

a load device connected to said main smoothing capacitor as a DC voltage source for receiving said first DC voltage (Vd) applied to said main smoothing capacitor; and said AC/DC power converter further comprising a PWM converter for controlling an input current (Is) supplied from said single-phase AC power source such that said first DC voltage (Vd) applied to said main smoothing capacitor is practically constant.

\* \* \* \* \*